US008260279B2

(12) United States Patent
Kiasaleh et al.

(10) Patent No.: US 8,260,279 B2
(45) Date of Patent: Sep. 4, 2012

(54) SYSTEM, METHOD AND APPARATUS FOR PROVIDING COMMUNICATIONS THAT CONFORM TO A CELLULAR COMMUNICATION STANDARD AND A NON-CELLULAR COMMUNICATION STANDARD

(75) Inventors: Kamran Kiasaleh, Plano, TX (US); Poras T. Balsara, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 444 days.

(21) Appl. No.: 12/618,754

(22) Filed: Nov. 15, 2009

(65) Prior Publication Data

US 2010/0144333 A1    Jun. 10, 2010

Related U.S. Application Data

(60) Provisional application No. 61/115,074, filed on Nov. 15, 2008.

(51) Int. Cl.
   *H04M 3/00*    (2006.01)
(52) U.S. Cl. .............. 455/418; 455/550.1; 455/552.1; 455/553.1; 455/557
(58) Field of Classification Search .......... 455/418–420, 455/550.1, 552.1, 553.1, 557
   See application file for complete search history.

(56) References Cited

U.S. PATENT DOCUMENTS

| | | | | |
|---|---|---|---|---|
| 4,737,975 A * | 4/1988 | Shafer | ........................... | 455/418 |
| 5,862,474 A * | 1/1999 | Kimball | ........................ | 455/418 |
| 6,134,453 A * | 10/2000 | Sainton et al. | ............. | 455/553.1 |
| 6,404,775 B1 * | 6/2002 | Leslie et al. | .................. | 370/466 |
| 6,785,556 B2 * | 8/2004 | Souissi | .......................... | 455/557 |
| 7,136,643 B2 * | 11/2006 | Campbell | ...................... | 455/431 |
| 7,474,891 B2 * | 1/2009 | Toms et al. | .................... | 455/419 |
| 7,499,724 B2 * | 3/2009 | Palum et al. | ............... | 455/550.1 |
| 7,567,791 B2 * | 7/2009 | Laroia et al. | ............... | 455/343.2 |
| 8,050,708 B2 * | 11/2011 | March et al. | ............... | 455/552.1 |
| 8,095,173 B2 * | 1/2012 | Chapyzhenka et al. | ... | 455/550.1 |
| 8,107,939 B2 * | 1/2012 | Hassan et al. | ................. | 455/418 |
| 2003/0158954 A1 * | 8/2003 | Williams | ...................... | 709/230 |

* cited by examiner

*Primary Examiner* — Sharad Rampuria
(74) *Attorney, Agent, or Firm* — Schultz & Associates, P.C.

(57) ABSTRACT

The present invention provides a software defined radio transceiver that includes a programmable cellular radio front end and a programmable baseband processor. The programmable cellular radio front end is typically a digital radio frequency processor configured to support a cellular communication standard. The programmable baseband processor is connected to the digital radio frequency processor. The programmable baseband processor (a) selectively reconfigures the cellular configured digital radio frequency processor to support a non-cellular communication standard by bypassing one or more cellular communication standard specific function, and modifying one or more operating parameters to conform to the non-cellular communication standard, (b) processes input data in accordance with the non-cellular communication standard and provides the processed input data to the digital radio frequency processor for transmission, and (c) receives output data from the digital radio frequency processor and processes the received output data to obtain transmitted data.

28 Claims, 24 Drawing Sheets

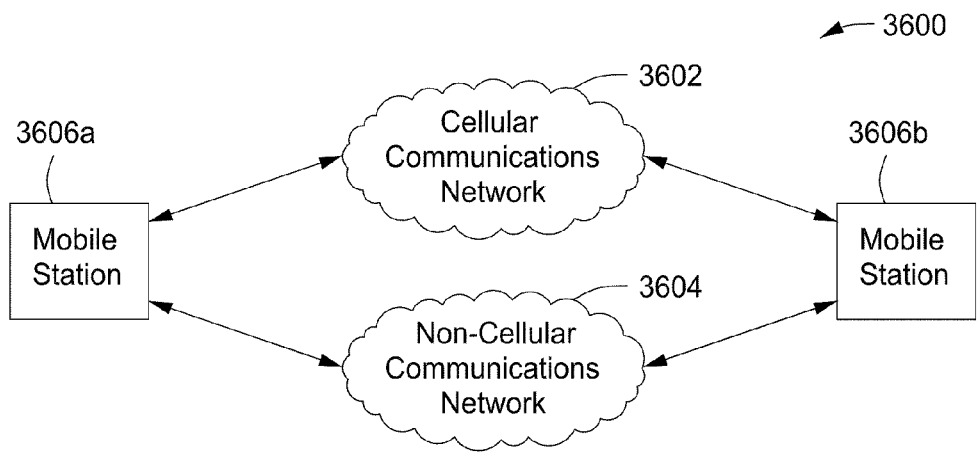
FIG. 36
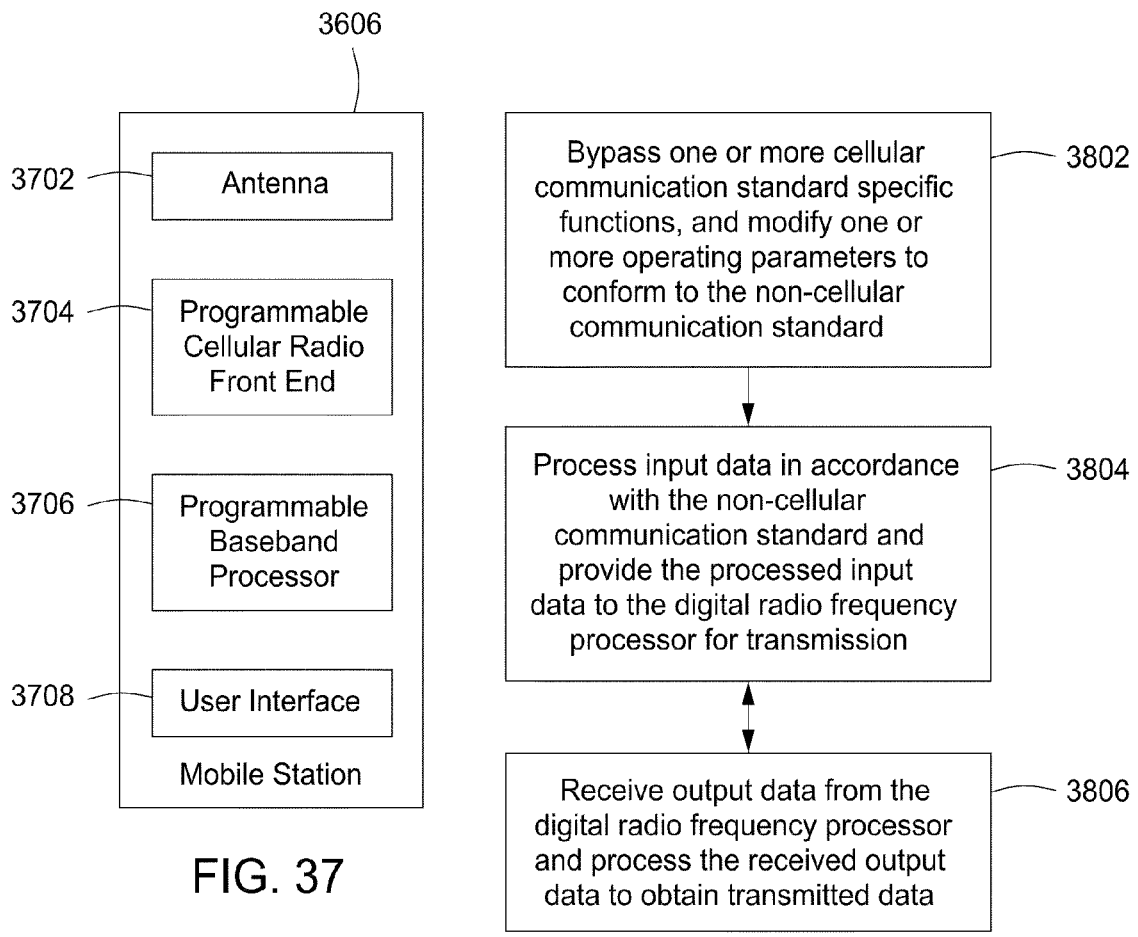
FIG. 37
FIG. 38

SYSTEM, METHOD AND APPARATUS FOR PROVIDING COMMUNICATIONS THAT CONFORM TO A CELLULAR COMMUNICATION STANDARD AND A NON-CELLULAR COMMUNICATION STANDARD

CROSS REFERENCE TO RELATED APPLICATIONS

This patent application is a non-provisional patent application of U.S. patent application 61/115,074 filed on Nov. 15, 2008 and entitled "System, Method and Apparatus for Providing Communications that Conform to a Cellular Communication Standard and a Non-Cellular Communication Standard," which is hereby incorporated by reference in its entirety.

STATEMENT OF FEDERALLY FUNDED RESEARCH

This invention was made with government support under Award Number 2006-IJ-CX-K043 awarded by the National Institute of Justice. The government has certain rights in this invention.

FIELD OF THE INVENTION

The present invention relates generally to the field of telecommunications and, more particularly, to a system, method and apparatus for providing communications that conform to a cellular communication standard and a non-cellular communication standard.

BACKGROUND OF THE INVENTION

In the last few years, there has been great development in semiconductor technology that allowed radio frequency (RF) and digital baseband integration in a complete system-on-chip (SoC). This was accompanied with the development of wireless communications standards such as WLAN, WiMAX. In addition, cellular communications standards have been modified to provide services beyond voice communications such as high data rate and video communications. For example, EDGE and GPRS are two enhancements that provide high data rate capability for the GSM standard that was originally designed for voice communications. The huge end user demand for integrating different services on a single handset, in addition to the requirement of global roaming, led the manufacturers to strive to develop software-defined radio (SDR).

Despite the great development in semiconductor technology, circuit design techniques are still not capable of providing a full spectrum of SDR operation. That's why different terminology appeared, like multiband, multistandard or multimode, and all are considered under the umbrella of SDR, although they are really not. A transceiver can be referred to as SDR if its communication functions are realized as programs running on a suitable processor. Based on the same hardware, different transmitter/receiver algorithms, which usually describe transmission standards, are implemented in software.

Project 25 (P25) is an open architecture, user driven suite of system standards that define digital radio communications system architectures capable of serving the needs of Public Safety and Government organizations. The P25 suite of standards involves digital Land Mobile Radio (LMR) services for local, state/provincial and national (federal) public safety organizations and agencies. A P25 radio is any radio that conforms to the P25 standard in the way it functions or operates. That is why there is great interest in integrating P25 capability in cellular handsets. P25 compliant technology is being deployed in several phases. Despite this great interest, a cost effective, small profile, integrated P25/celluar handset has not been developed.

As a result, there is a need for a system, method and apparatus for providing communications that conform to a cellular communication standard (e.g., CDMA, WCDMA, EDGE, GPRS, GSM, LTE, TDMA, OFDM, etc.) and a non-cellular communication standard (e.g., Bluetooth, IEEE 802.11, P25, UMTS, non-P25 emergency standard, etc.).

SUMMARY OF THE INVENTION

After many years of research and development in the wireless communication community, software defined radio (SDR) is no longer an unachievable dream. The present invention provides a practical SDR transmitter that is reconfigurable, programmable and uses available computational power in a commercial Digital RF Processor (DRP™)-based single-chip GSM/EDGE radio. This GSM/EDGE chip has been successfully reconfigured to modulate the RF carrier with P25 compliant C4FM (continuous 4-level FM) data. Note that P25 is a digital public safety standard that operates in the 746-806 MHz frequency band, which is different from the normal operation band of the GSM/EDGE chip. The modulation is based completely on software without need for any hardware modifications. The measurement results show that the transmitted signal spectrum is compliant with the P25 standard specifications. Moreover, the present invention can be extended to provide more elaborate modulation schemes.

The present invention provides a software defined radio transceiver that includes a programmable cellular radio front end and a programmable baseband processor. The programmable cellular radio front end is typically a digital radio frequency processor configured to support a cellular communication standard. The programmable baseband processor is connected to the digital radio frequency processor. The programmable baseband processor (a) selectively reconfigures the cellular configured digital radio frequency processor to support a non-cellular communication standard by bypassing one or more cellular communication standard specific function, and modifying one or more operating parameters to conform to the non-cellular communication standard, (b) processes input data in accordance with the non-cellular communication standard and provides the processed input data to the digital radio frequency processor for transmission, and (c) receives output data from the digital radio frequency processor and processes the received output data to obtain transmitted data.

In addition, the present invention provides communications that conform to a cellular communication standard and a non-cellular communication standard by: (a) providing a programmable cellular radio front end comprising a digital radio frequency processor configured to support the cellular communication standard; (b) providing a programmable baseband processor connected to the digital radio frequency processor that selectively reconfigures the cellular configured digital radio frequency processor to support the non-cellular communication standard or the cellular communication standard; (c) performing communications conforming to the cellular communication standard by configuring the cellular configured digital radio frequency processor to support the non-cellular communication standard by (i) enabling one or more cellular communication standard specific functions, and modifying one or more operating parameters to conform to the cellular communication standard, (ii) processing input data in accordance with the cellular communication standard and providing the processed input data to the digital radio frequency processor for transmission, and (iii) receiving output data from the digital radio frequency processor and processing the received output data to obtain transmitted data; and (d) performing communications conforming to the non-cellular communication standard by configuring the cellular configured digital radio frequency processor to support the non-cellular communication standard by (i) by reconfiguring the cellular configured digital radio frequency processor to support the non-cellular communication standard by bypassing the cellular communication standard specific functions, and modifying the operating parameters to conform to the non-cellular communication standard, (ii) processing input data in accordance with the non-cellular communication standard and providing the processed input data to the digital radio frequency processor for transmission, and (iii) receiving output data from the digital radio frequency processor and processing the received output data to obtain transmitted data transceiver.

The present invention also provides a system that includes a cellular communications network supporting a cellular communication standard, a non-cellular communications network supporting a non-cellular communication standard, and two or more mobile stations that can communicate with both the cellular communications network and the non-cellular communications network. Each mobile station includes an antenna, a programmable cellular radio front end that includes a digital radio frequency processor configured to support a cellular communication standard, and a programmable baseband processor connected to the digital radio frequency processor that (a) selectively reconfigures the cellular configured digital radio frequency processor to communicate with the non-cellular communications network by bypassing one or more cellular communication standard specific function, and modifying one or more operating parameters to conform to the non-cellular communication standard, (b) processes input data in accordance with the non-cellular communication standard and provides the processed input data to the digital radio frequency processor for transmission, and (c) receives output data from the digital radio frequency processor and processes the received output data to obtain transmitted data.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 36 is a block diagram of a system that provides communications supported by a cellular communication standard and a non-cellular communication standard in accordance with one embodiment of the present invention;

FIG. 37 is a block diagram of a mobile station in accordance with one embodiment of the present invention;

FIG. 38 is a block diagram illustrating the functionality of the programmable baseband processor in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to a software defined radio (SDR) transceiver that supports both GSM/EDGE and P25 communication protocols, but it will be understood that the concepts of the present invention are applicable to any SDR transceiver that supports both a cellular communication standard (e.g., CDMA, WCDMA, EDGE, GPRS, GSM, LTE, TDMA, OFDM, etc.) and a non-cellular communication standard (e.g., Bluetooth, IEEE 802.11, P25, UMTS, non-P25 emergency standard, etc.).

The present invention provides a practical SDR transmitter that is reconfigurable, programmable and uses available computational power in a commercial Digital RF Processor (DRP™)-based single-chip GSM/EDGE radio. The baseband can directly modulate the carrier in phase, frequency and/or amplitude, which allows for RF modulation of any signal using a programmable baseband signal. In addition, this removes the need for up and down conversion (mixers, etc.) and allows the RF signal to be changed using a digital bit stream. This GSM/EDGE chip has been successfully reconfigured to modulate the RF carrier with P25 compliant C4FM (continuous 4-level FM) data. Note that P25 is a digital public safety standard that operates in the 746-806 MHz frequency band, which is different from the normal operation band of the GSM/EDGE chip. The modulation is based completely on software without need for any hardware modifications. The measurement results show that the transmitted signal spectrum is compliant with the P25 standard specifications. Moreover, the present invention can be extended to provide more elaborate modulation schemes.

Figure 1:
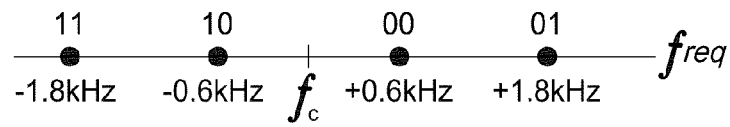
FIG. 1 depicts C4FM modulation in the frequency plane showing symbol mappings in accordance with one embodiment of the present invention.
Figure 2:
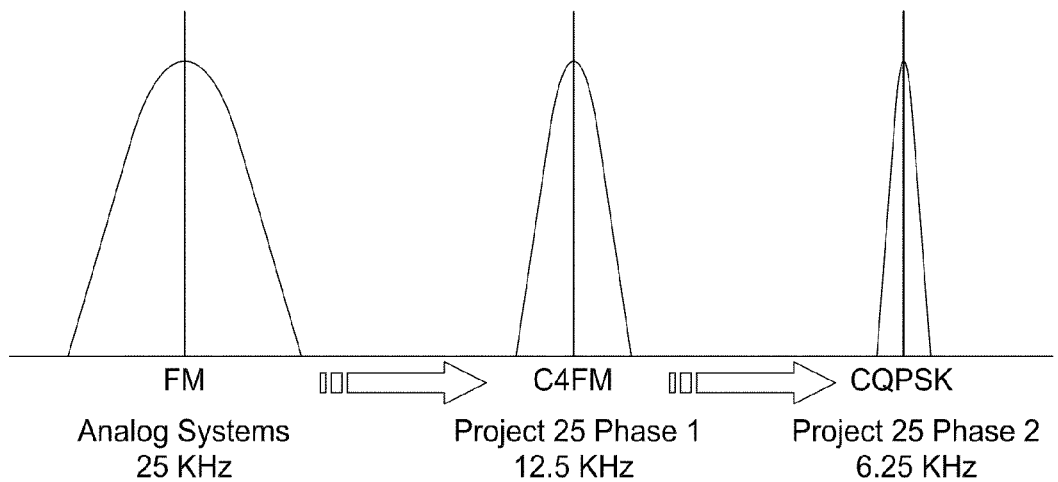
FIG. 2 depicts the spectral efficiency of CQPSK versus C4FM and Analog FM.

The present invention was developed in two phases. Phase 1 used continuous 4-level FM (C4FM) non-linear modulation for digital transmission in a 12.5 kHz channel. Phase 2 used CQPSK modulation to transmit digital data over a 6.25 kHz channel. Both Phase 1 and Phase 2 used 9.6 kbps data rate. This is translated into 4.8 kHz symbol rate (2 bits per symbol). FIG. 1 depicts C4FM modulation in the frequency plane showing symbol mappings in accordance with one embodiment of the present invention (4 frequency deviations corresponding to the 4 data symbols). CQPSK modulates the phase and simultaneously modulates the carrier amplitude to minimize the width of the emitted spectrum which generates an amplitude modulated waveform. The main advantage of using CQPSK is to make the transmission spectral efficient as shown in FIG. 2 where CQPSK is compared to Phase 1 C4FM modulation, and analog FM modulation.

Figure 3:
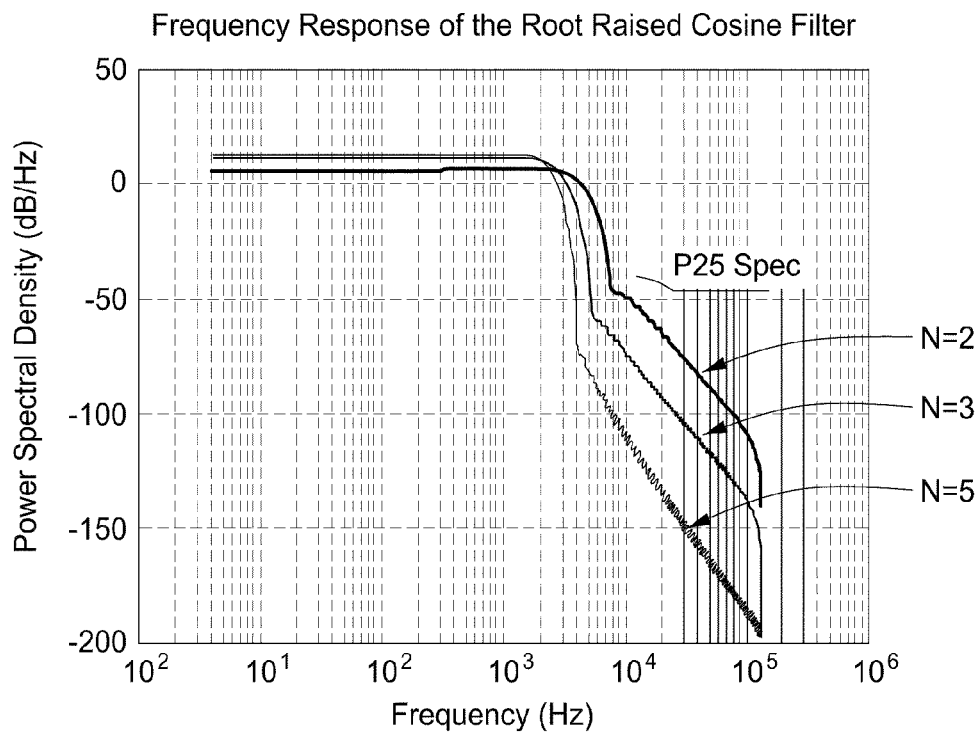
FIG. 3 is a graph depicting the effect of the length of pulse shaping filter impulse response in accordance with one embodiment of the present invention.

The Phase 1 P25 transmitter employs a root raised-cosine pulse shaping filter before modulating the RF carrier. Since the filter impulse response, which decides the pulse shape, cannot be realized as infinite in time, the length of the filter impulse response (in number of symbols) is chosen to provide proper filtering action in the frequency domain. Proper filtering action means that the frequency response of the filter satisfies the noise profile of the P25 standard. FIG. 3 shows the frequency response of the root raised-cosine pulse shaping filter having impulse response length of 2, 3 and 5 symbols. It is quite clear that two symbols are sufficient. Yet, using three symbols is better because it provides some extra margin.

Figure 4:
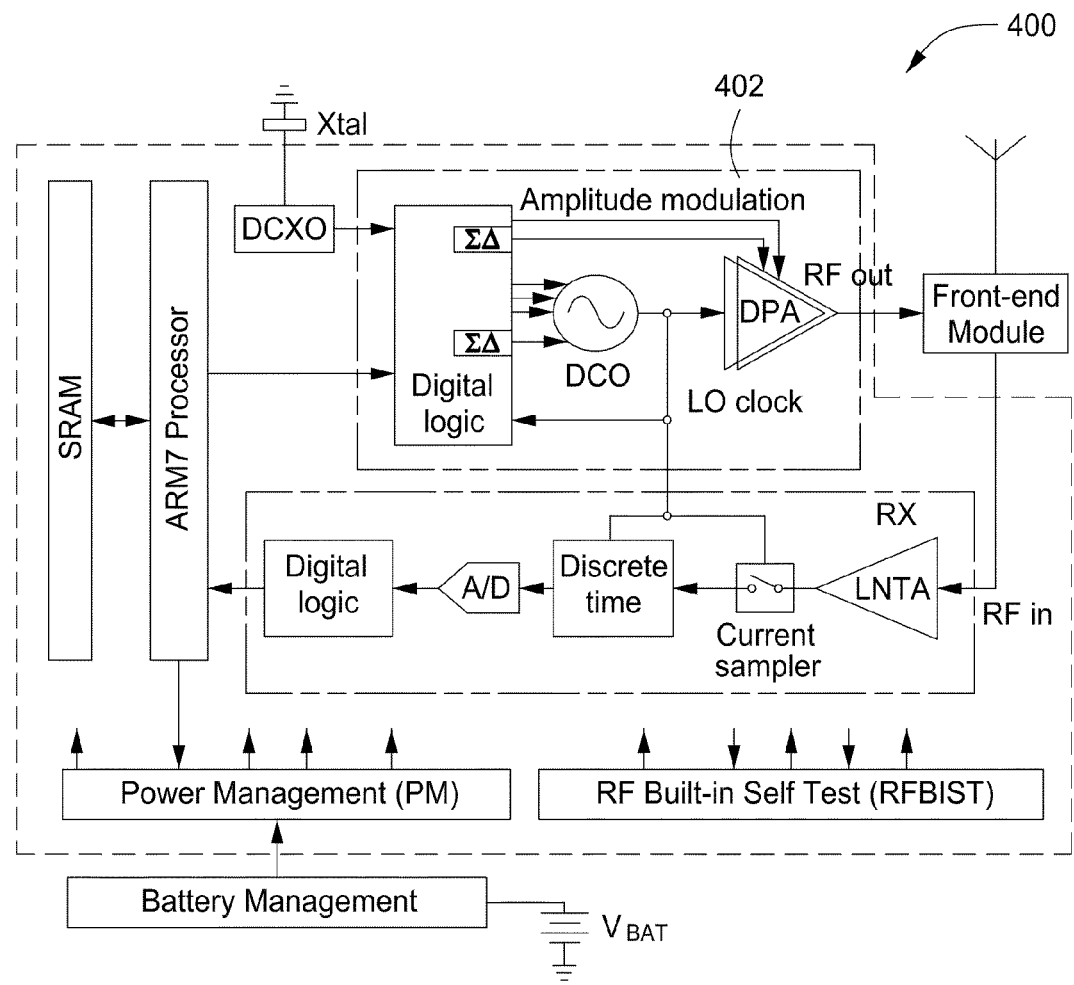
FIG. 4 is a block diagram of the TI single-chip GSM/EDGE with an all-digital local oscillator and transmitter.

The GSM/EDGE radio IC used in the present invention is a commercially available DRP chip available from TEXAS INSTRUMENTS that has extensive reconfigurability and programmability features. A high-level block diagram of the TI DRP chip 400 is shown in FIG. 4. Most of the discussion herein focuses on the transmitter (TX) part 402 of the system because the receiver (RX) radio portion 404 can be common between both Phase-1 and Phase-2 P25 demodulation paths. Therefore all the receiver development work (done in this project for Phase-1) still applies for Phase-2. The main difference is in the TX portion 402 of the radio.

Figure 5:
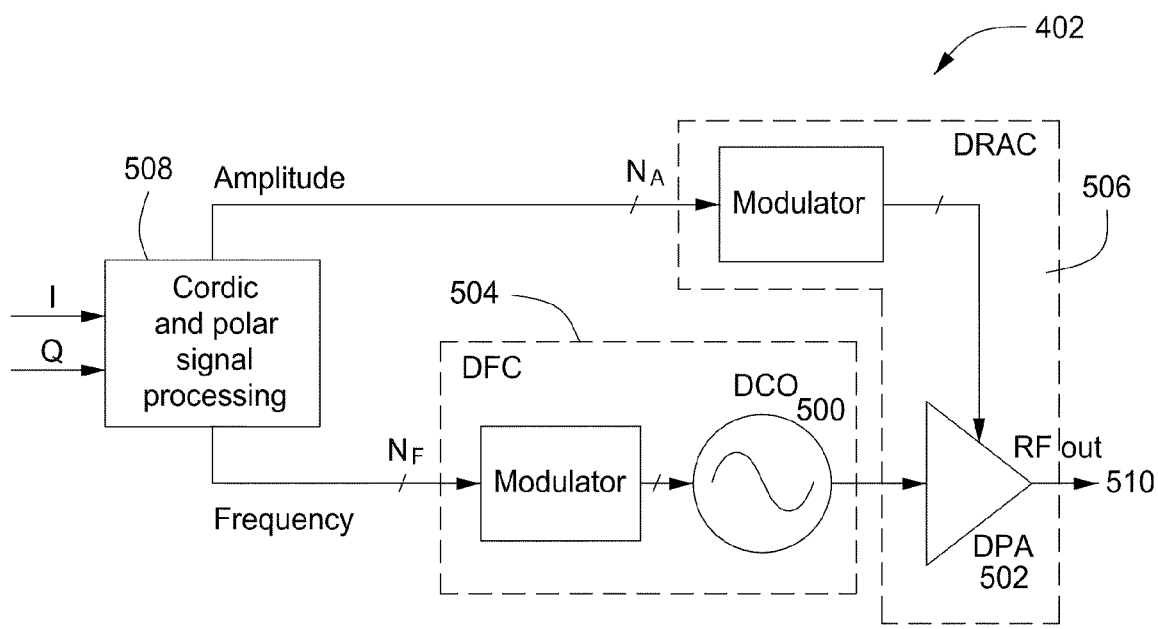
FIG. 5 is a simplified block diagram of the polar transmitter based on DCO and DPA circuits in the TI chip.
Figure 6:
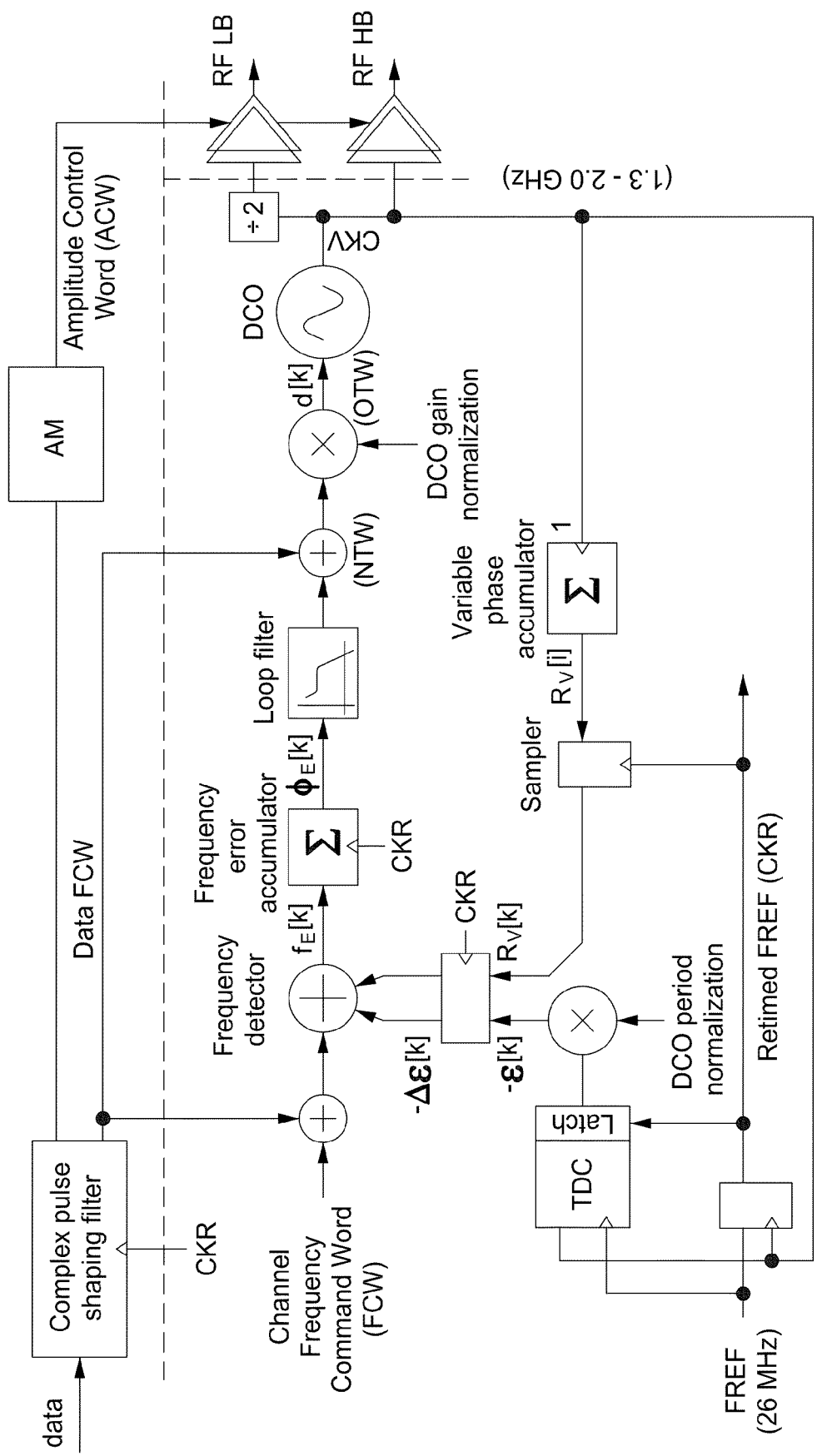
FIG. 6 is a block diagram of an all-digital PLL (around a DCO) and polar TX in accordance with the present invention.

FIG. 5 shows a simplified block diagram of the DRP TX 402. The TX 402 is based on a polar architecture composed of a digitally-controlled oscillator (DCO) 500 and a digitally-controlled power amplifier (DPA) 502. The DCO 500 operates as a digital-to-frequency/phase converter (DFC) 504, while the DPA 502 operates as digital-to-RF-Amplitude converter (DRAC) 506. Basically, the digital I and Q signals generated in the transmitter digital back-end are converted into amplitude and phase signals using a Cordic processor 508, which is a Cartesian-to-polar converter. The amplitude and phase digital data are then fed to the DPA 502 and DCO 500 respectively. The two signals are combined together in the DPA 502 in order to generate the RF non-constant envelop modulated signal 510. It is worth mentioning here that both the DCO 500 and the DPA 502 utilize ΔΣ-modulation in order to achieve very high resolution. The DCO 500 is not a free-running oscillator as it may seem to be in FIG. 5. It is actually locked to a reference signal using an all-digital phase locked loop. This is shown in more detail in FIG. 6. In Phase-1, the frequency modulation data path was used to perform C4FM modulation. This is almost what is needed to use for phase modulation in Phase-2.

Figure 7:
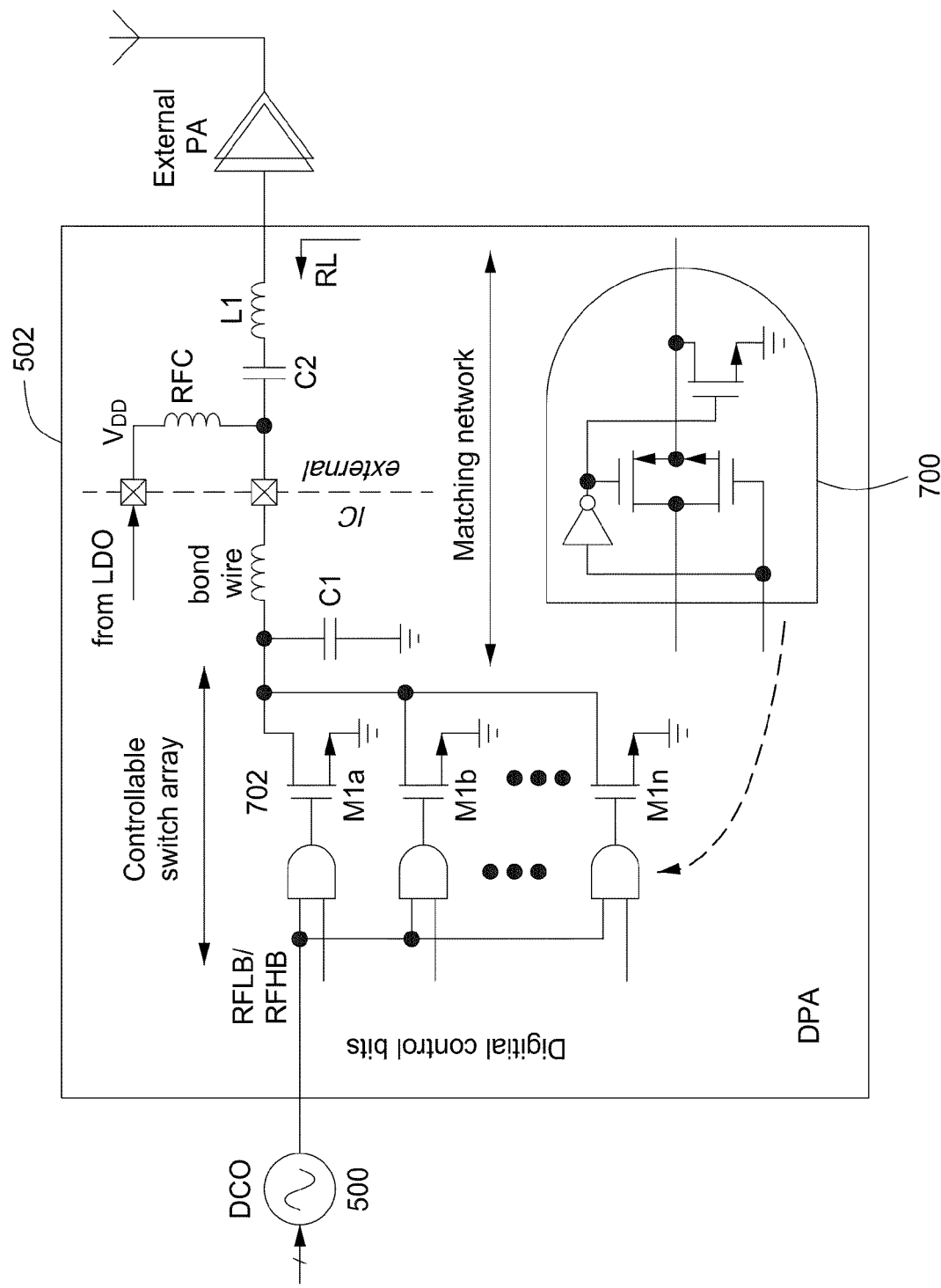
FIG. 7 is a block diagram of a digitally controlled power amplifier (DPA) structure in the TI chip.

The amplitude and phase information are combined in the DPA 502 to generate the RF modulated signal ready for transmission. FIG. 7 shows the DPA 502 in more detail. The DCO phase modulated signal, which is a square wave signal swinging from 0 to VDD (supply voltage), is fed to all the AND gates 700 shown in FIG. 7. The outputs of the AND gates 700 are gated by the amplitude digital-control bits 702. Therefore, the total current at the output of all AND gates 700 is a summation of n equal DCO signals given that n amplitude control bits 702 are high (ON). This scales the amplitude of the DPA output signal based on the digital control bits 702, while the phase is essentially controlled by the ADPLL circuit controlling the DCO 500.

Figure 9A:
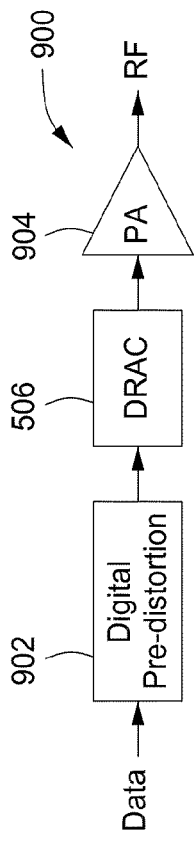
FIGS. 9A and 9B are a block diagram and a graph for a linearized PA C/C.
Figure 9B:
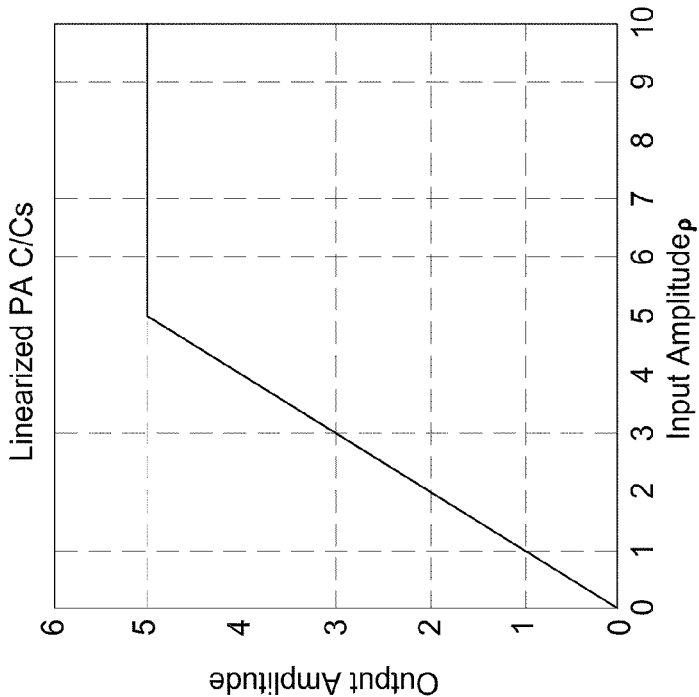
Figure 8A:
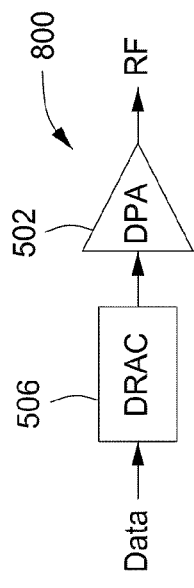
FIGS. 8A and 8B are a block diagram and a graph for a non-linear PA C/C.
Figure 8B:
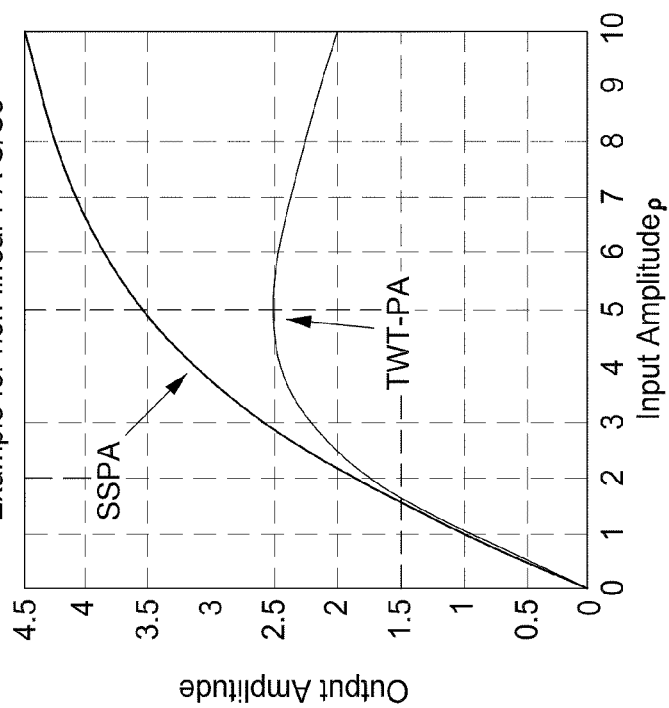

The last important building block of the all-digital TX is the digital pre-distortion block 902 feeding the digital amplitude control bits to the DPA 502 which was not shown in the previous blocks. There is a big trade-off between the linearity of a power amplifier and its power efficiency. A linear power amplifier is not efficient and an efficient power amplifier is terribly non-linear. Since power efficiency is very important in mobile applications, the trend is to use an efficient non-linear power amplifier, and then correct for its non-linearity using digital techniques. This is done by measuring the response of the power amplifier to different input power levels. This response (or transfer C/Cs) is inverted and programmed in a digital pre-distortion block 902 so that the data effectively sees a linear response. FIGS. 8A and 8B are a block diagram and a graph for a non-linear PA C/C 800. The non-linear PA C/C 800 includes a DRAC 506 feeding a DPA 502 to generate the RF signal. The graph shows curves for SSPA and TWT-PA. In contrast, FIGS. 9A and 9B are a block diagram and a graph for a linearized PA C/C 900. The linearized PA C/C 900 includes a digital pre-distortion block 902 feeding a DRAC 506 which feeds a PA 904 to generate the RF signal.

Figure 10:
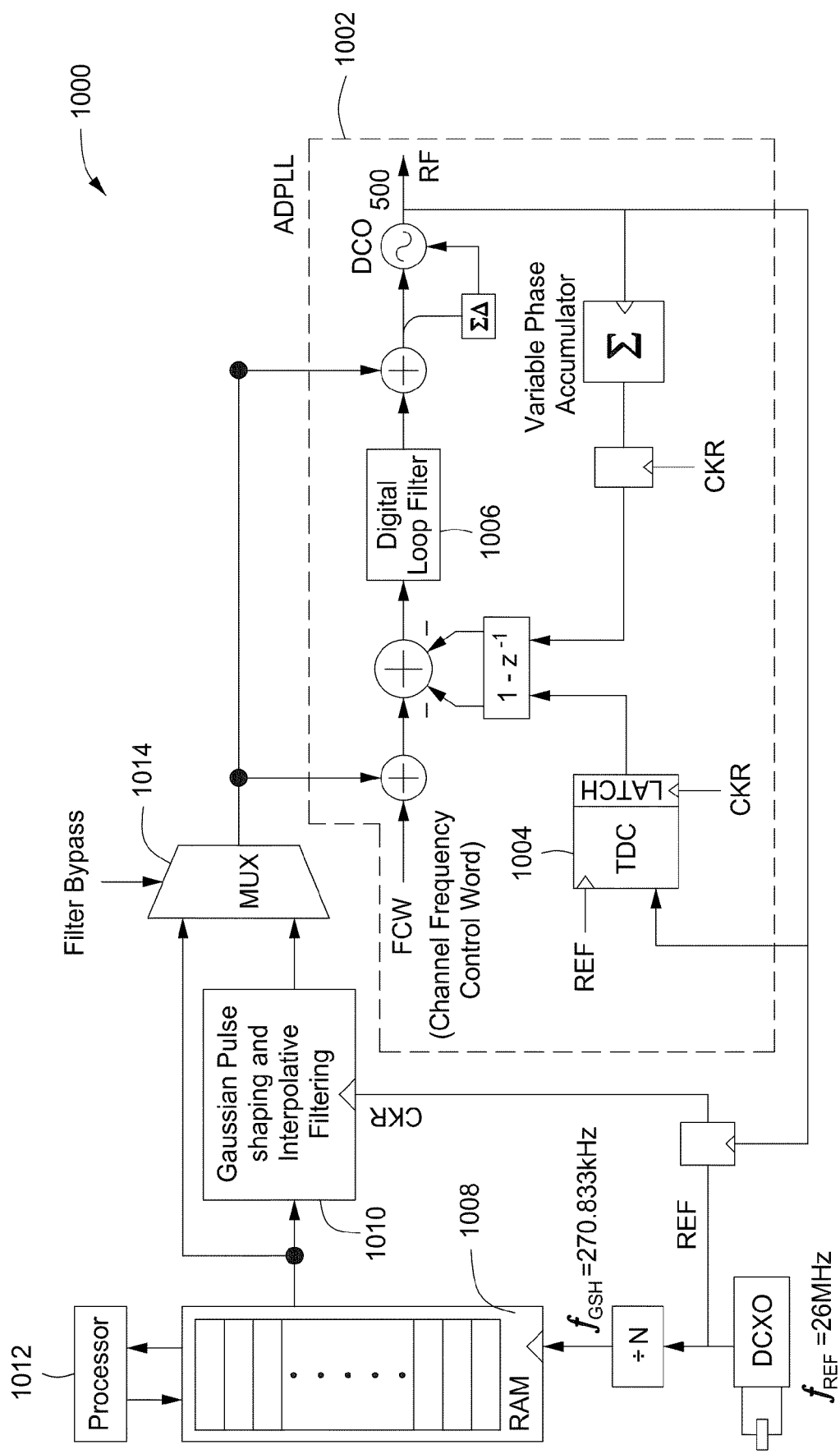
FIG. 10 is a block diagram of an all-digital PLL based GSM transmitter in accordance with one embodiment of the present invention.

Phase 1 will now be described in more detail. FIG. 10 shows a simplified block diagram for the Phase 1 GSM transmitter 1000. The AM modulation path of the polar transmitter, which is used in EDGE transmission, is not shown in this block diagram, since the Phase 1 work only involves the C4FM frequency modulation of the P25 standard. The core of the transmitter is an all-digital PLL (ADPLL) 1002, which is formed of digital phase detection and filtering built around a digitally controlled oscillator (DCO) 500. The digital phase detection circuit provides an integer phase resolution by accumulating clock edges of the frequency reference (REF) and RF signals and performing a fixed-point subtraction. In order to account for the frequency difference between the REF and RF signals, the input to the accumulator clocked by the retimed REF clock (CKR) signal is a frequency control word (FCW). The FCW is the ratio between the desired RF frequency and the reference frequency. The time-to-digital converter (TDC) 1004 provides fractional (i.e., sub DCO period) timing resolution. The phase error at the output of the phase detection and the TDC 1004 is filtered in a high order digital filter 1006 and fed to the DCO 500 as a frequency tuning word. Frequency modulation is done by adding a modulation frequency word to the FCW. The value of the modulation frequency word is equal to the required frequency deviation from the carrier. For example, a digital word that corresponds to a maximum frequency deviation of ±67 kHz is added to FCW in the GSM modulation.

The modulation data word is read real-time from a random access memory (RAM) 1008 that is clocked at the GSM data rate equal to 270.833 kHz. This means that a new modulation data word is read every 3.692 μsec. Before being added to the FCW at the ADPLL input, the modulation data word is filtered in a Gaussian interpolative filter 1010 that provides pulse shaping as defined in the GSM standard.

Figure 11:
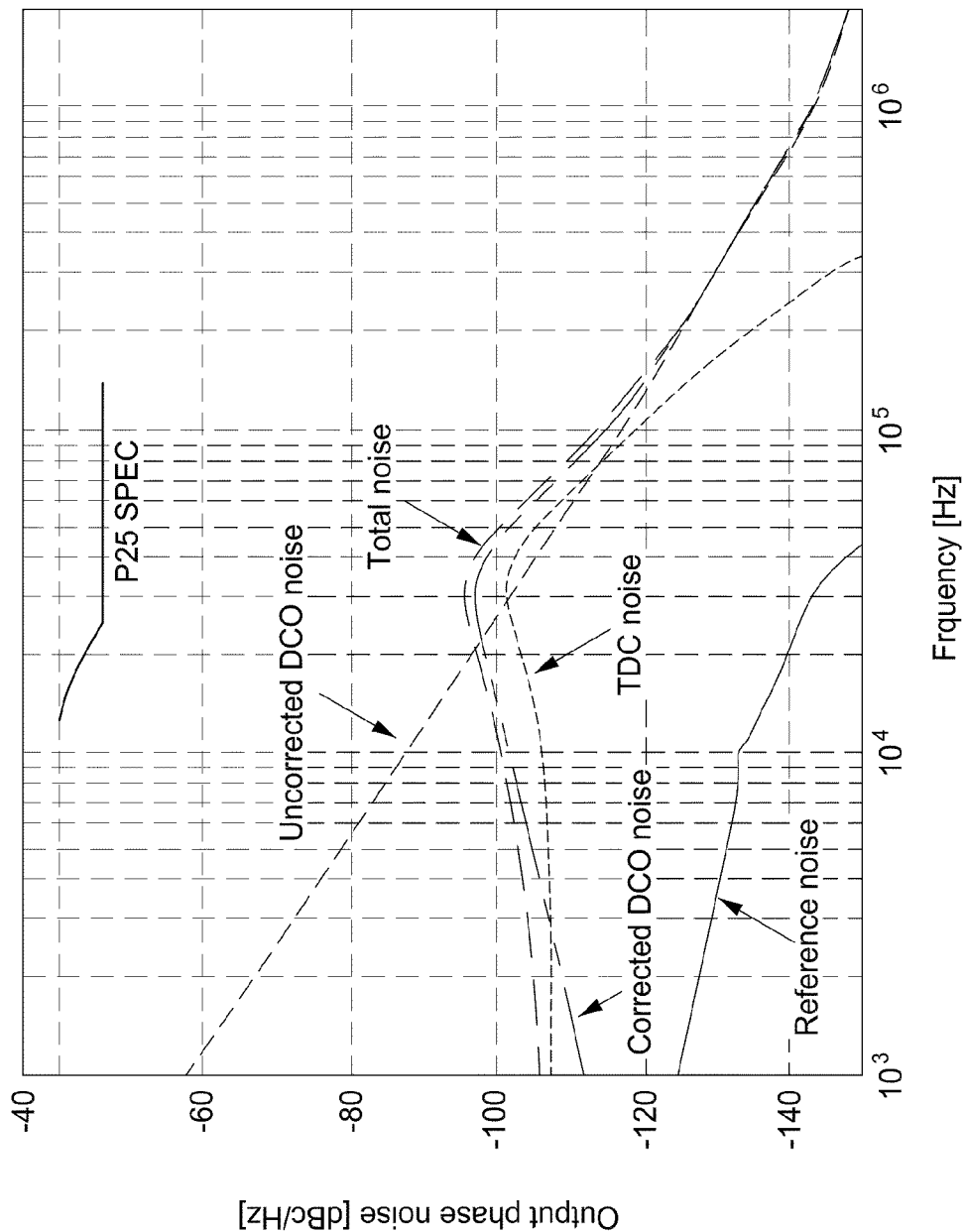
FIG. 11 is a graph of the ADPLL phase noise components at the nominal loop filter settings in accordance with one embodiment of the present invention.

FIG. 11 shows simulation results for the phase noise contributions of the different ADPLL components at its output in accordance with one embodiment of the present invention. FIG. 11 also shows the total phase noise at the ADPLL output. Although the PLL bandwidth is 30 kHz, which is relatively wide corresponding to the P25 maximum frequency deviation of 1.8 kHz, the total ADPLL phase noise is far below the P25 spec. This guarantees that the P25 modulation can be done using this chip. This is indeed very encouraging, since it means that the P25 standard can be integrated into GSM cellular handsets with almost no additional cost.

Figure 12:
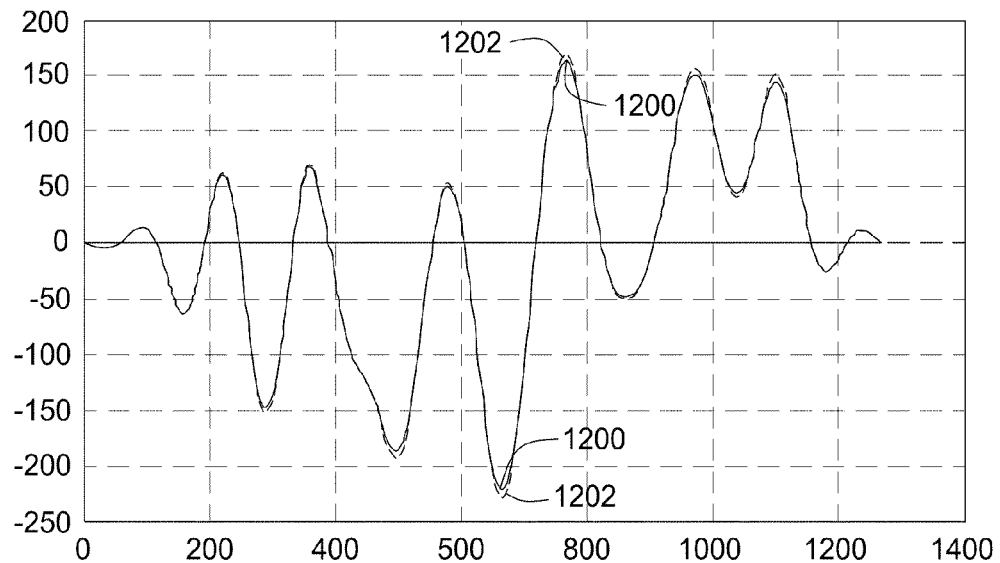
FIG. 12 is a graph comparing the frequency vs time plots for the ideal data generated using MATLAB and ARM in accordance with one embodiment of the present invention.
Figure 13A:
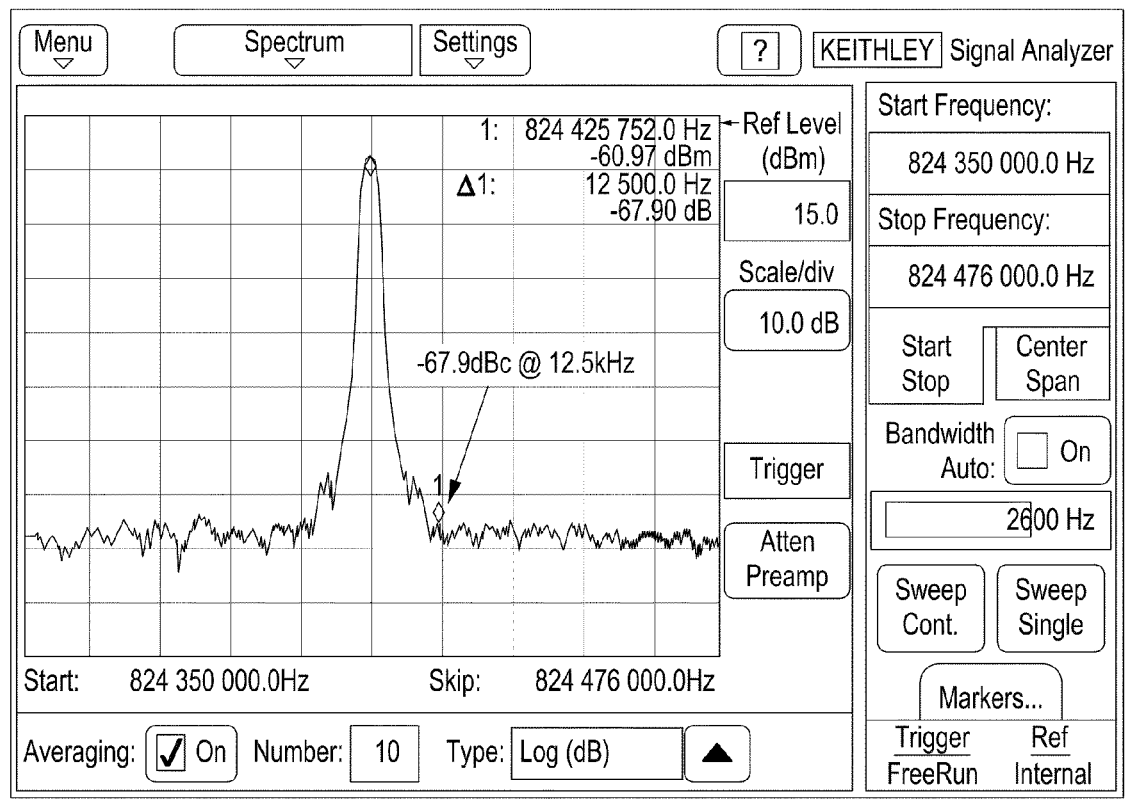
FIGS. 13A and 13B shows the spectrum of signal using MATLAB and ARM in accordance with one embodiment of the present invention.
Figure 13B:
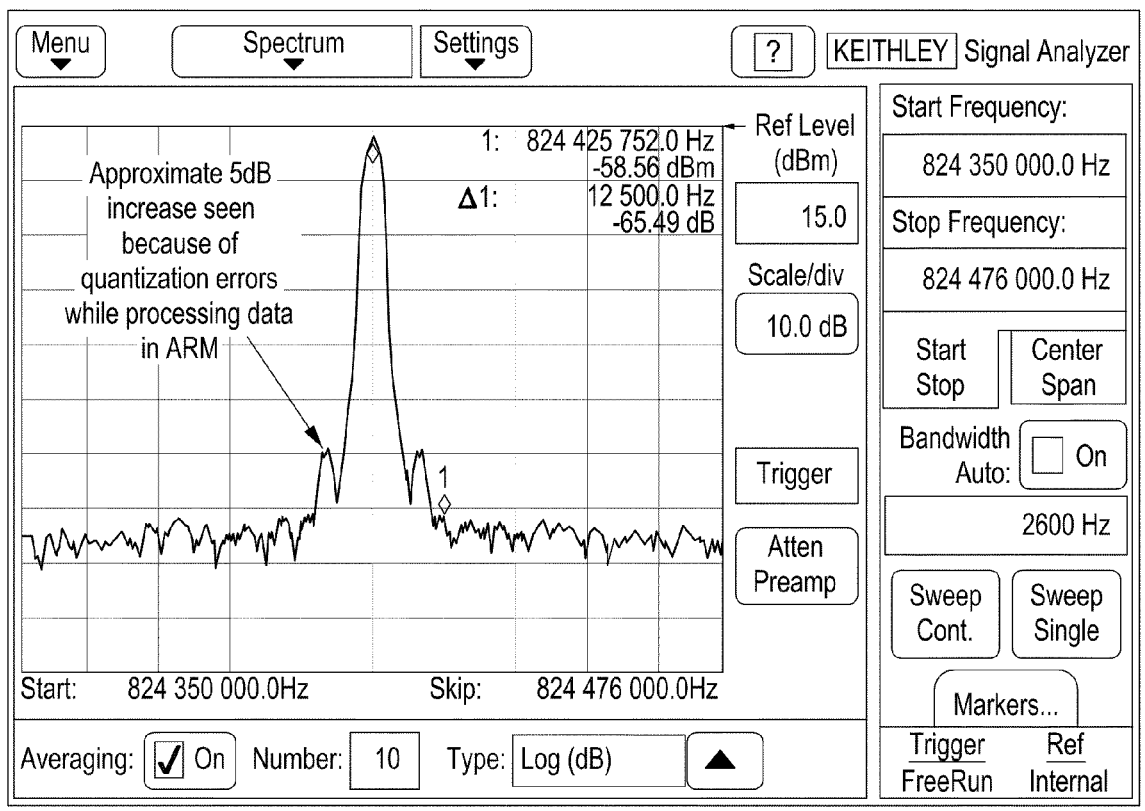

In the GSM/EDGE transceiver chip, there are embedded processors that perform different configuration and control functions. For example, one task of one of the processors is to set the default values for all the registers in the chip, such as the registers that store the default values of the ADPLL loop filter parameters. One of the embedded processors 1012 (shown as part of FIG. 10) controls the modulation process. Processor 1012 loads the modulation data control word into the RAM 1008. After that, the data word is filtered and applied to the ADPLL 1002 to modulate the RF carrier. One way to implement a software radio transmitter is to tap the powerful computational power such as DSP and/or ARM processors which are already available on the SoC. While bypassing the GSM gaussian pulse shaping filter 1010 (by controlling the MUX 1014 shown in FIG. 10), the processor 1012 can be programmed to handle different modulation schemes. For example, in order to generate P25 C4FM modulation data, the embedded processor 1012 should read digitized audio data from a CODEC chip at its input interface, and then perform software root raised-cosine filtering. The filtered data is then written to the RAM 1008 and applied directly to the ADPLL 1002 (added to FCW). But a slightly different approach is used. Instead of relying completely on the embedded processor 1012, MATLAB was used to generate random data, map the bits to symbols, perform software root raised-cosine cosine filtering, and finally generate the corresponding frequency modulation data word. The results are saved in a file. Later the ARM processors were used instead of MATLAB. A comparison of the frequency vs time plots for the ideal data generated using MATLAB and ARM are shown in FIG. 12. The MATLAB plot 1200 is virtually identical to the ARM plot 1202, except the MATLAB peaks are less than the ARM peaks. FIGS. 13A and 13B show the spectrum of signal using MATLAB and ARM, respectively.

Figure 14:
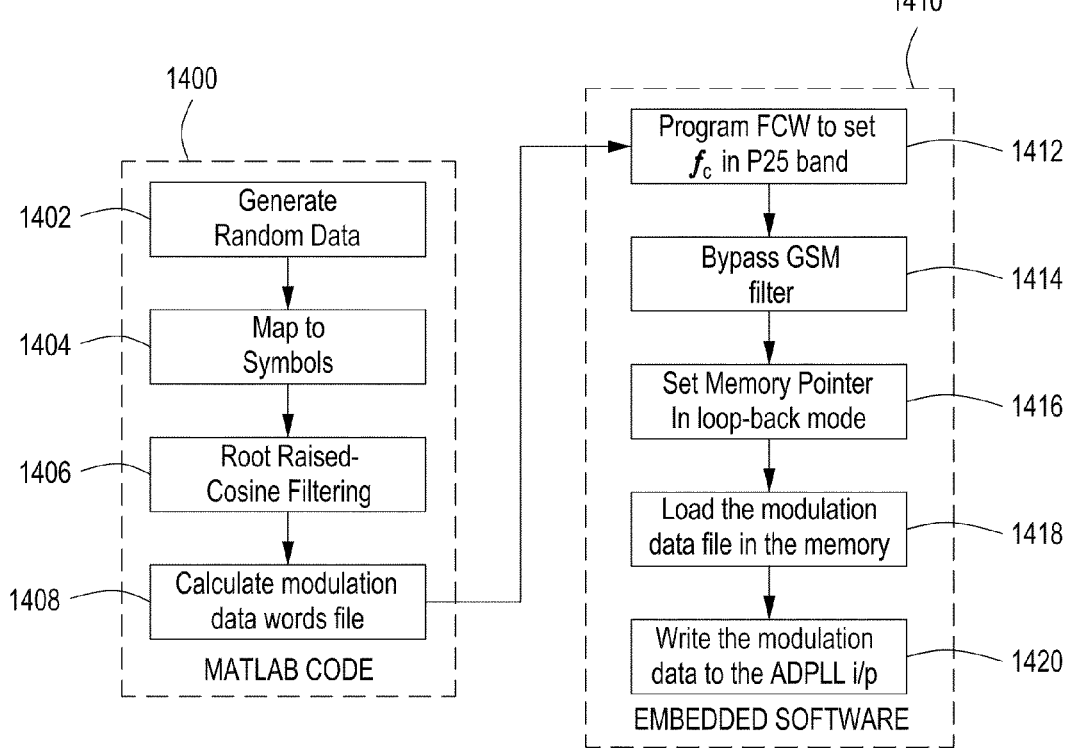
FIG. 14 is a flow chart illustrating the steps for performing Phase 1 P25 modulation on the GSM chip in accordance with one embodiment of the present invention.

The embedded processor 1012 loads the file into the RAM 1008 (FIG. 10) and then writes the frequency modulation data words one-by-one to the ADPLL input. In this way, the output of the ADPLL is P25 compliant C4FM modulated RF carrier. Note that the memory pointer, which refers to the memory location from which the modulation data word is read, is configured in a loop-back mode. This means that if there are 100 memory locations storing modulation data words, the pointer will loop back to location 1 after reading from location 100. This provides continuous real-time modulation, but the 100 data words must be selected carefully to avoid any periodicity in the output and to guarantee P25 compliant transition from the last symbol (location 100) to the first symbol (location 1). FIG. 14 shows a chart that summarizes all the steps in order to perform C4FM modulated carrier using MATLAB or ARM. The MATLAB code 1400 generates random data in block 1402, maps the data to symbols in block 1404, performs root raised-cosine filtering in block 1406 and calculates the modulation data words file in block 1408. Thereafter, the embedded software 1410 programs FCW to set $f_c$ in P25 band in block 1412, bypasses the GSM filter in block 1414, sets the memory pointer in loop-back mode in block 1416, loads the modulation data file in the memory in block 1418 and writes the modulation data to the ADPLL input in block 1420

Figure 15:
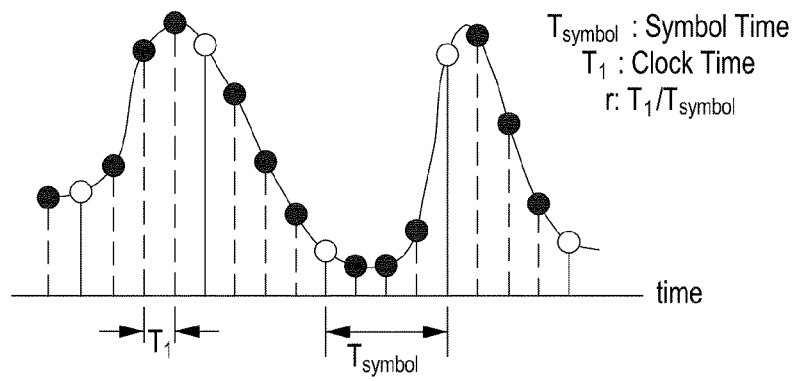
FIG. 15 is a graph illustrating the pulse shaping filter action with OSR r=4 in accordance with one embodiment of the present invention.

The first limitation in the approach described above is the memory-read clock frequency. The root raised-cosine pulse shaping filter upsamples the 4.8 kHz symbols, and produces samples at a rate equal to r×4.8 kHz, where r is the oversampling ratio. FIG. 15 illustrates this concept assuming r=4. The modulation data words are read from the memory at the GSM symbol rate equal to 270.833 kHz (because the chip was originally designed for GSM standard). This means that if the ratio between the GSM symbol rate and the P25 symbol rate is x, then each P25 (pulse-shaped) symbol must be represented by x GSM samples. Therefore, the root-raised cosine pulse shaping filter is designed with an oversampling factor r=x. The problem appears when x is a fractional number. One solution is to use interpolative pulse shaping filter as suggested in reference [6]. Another solution is to downsample the P25 symbols by a factor D and then use oversampling factor I in the filter, such that the net oversampling ratio r=I/D is equal to the non-integer ratio x. In this paper, for the sake of concept verification, although the ratio x=270.833/4.8=56.423 is non-integer we approximated the filter upsampling factor r to 57. The described solutions are based on the fact that the memory read clock is fixed and equal to the GSM symbol rate as shown in FIG. 10. A better solution is to have a programmable memory-read clock that can be chosen such that the ratio x is always an integer. This solution is not available in the TI chip because it was designed for GSM/EDGE applications. The second limitation in the approach described above is the memory size. Assuming that the memory size is n locations, the maximum number of P25 symbols that can be stored in the memory is equal to n/x where x is the number of GSM samples per P25 symbol rounded to the nearest integer. In the experiment, 1000 memory locations available, and so 17 P25 pulse-shaped symbols could be stored. And these symbols are repeated in the loop-back mode as previously described.

Figure 16:
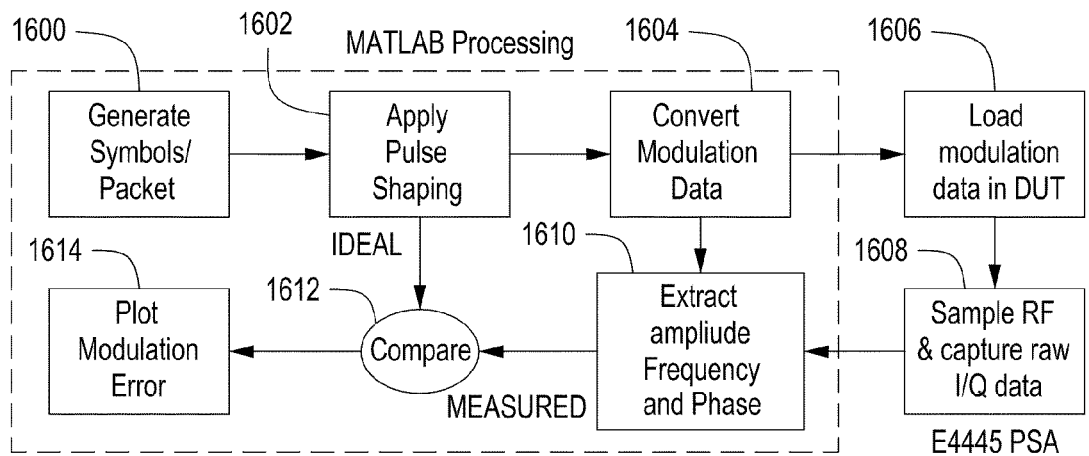
FIG. 16 is a validation flow diagram of the P25 Phase 1 standard in accordance with one embodiment of the present invention.

Devising a common platform for system verification and testing of radios supporting diverse order of modulation schemes is a challenge. In most cases, the instruments are designed to support a specific set of most commonly used wireless standards in the commercial sector. A more efficient approach to this problem, which was used in this project, is to use a generic vector spectrum analyzer as a sampler to output raw demodulated data. The modulation characteristics of the RF signal can then be determined by post-processing the raw data. This flow is graphically represented in FIG. 16. P25 C4FM modulation performance is analyzed using the stated flow. First, symbols are generated in MATLAB script from a random stream of bits in block 1600. The data is then passed through a raised-cosine pulse-shaping filter with an upsampling factor of 56, roll-off factor of 0.25, and filter group delay of 4 in block 1602. This filter simulates the combined effect of the two root-raised cosine filters used in the transmitter and receiver. The modulation data is converted in block 1604 and loaded in DUT in block 1606. The DRP modulator has a fixed sampling clock of 270.833 kSps and when an integer upsampling of 56 is applied, the resulting data rate at transmitter output is 4.836 kSps. Sample RF and capture raw IQ data in block 1608. The measured amplitude, frequency and phase is extracted in block 1610 from the converted modulation data in block 1604 and the sampled data in block 1608. The ideal data from block 1602 is compared with the measured data from block 1610 in block 1612. The modulation error is then plotted in block 1614.

Figure 17:
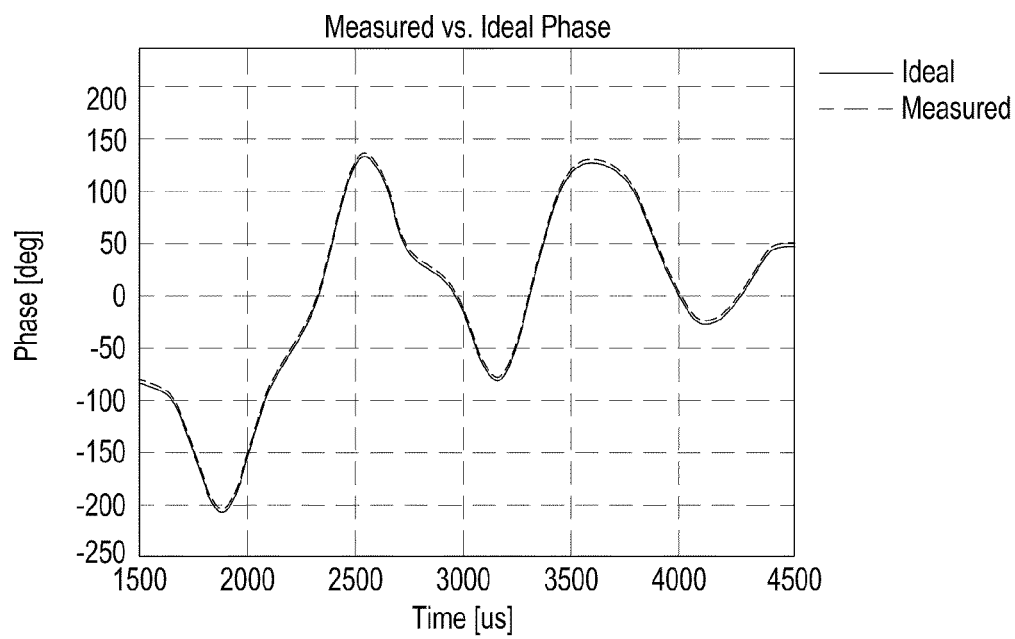
FIG. 17 is a graph of ideal and measured phase trajectory vs. time in accordance with one embodiment of the present invention.

FIG. 17 shows the simulated (solid line) and measured (dotted line) phase trajectory over the transmitted packet. The simulated phase (solid line) is obtained from the MATLAB script and measured phase (dotted line) is determined from raw I/Q data from the vector spectrum analyzer.

Figure 18:
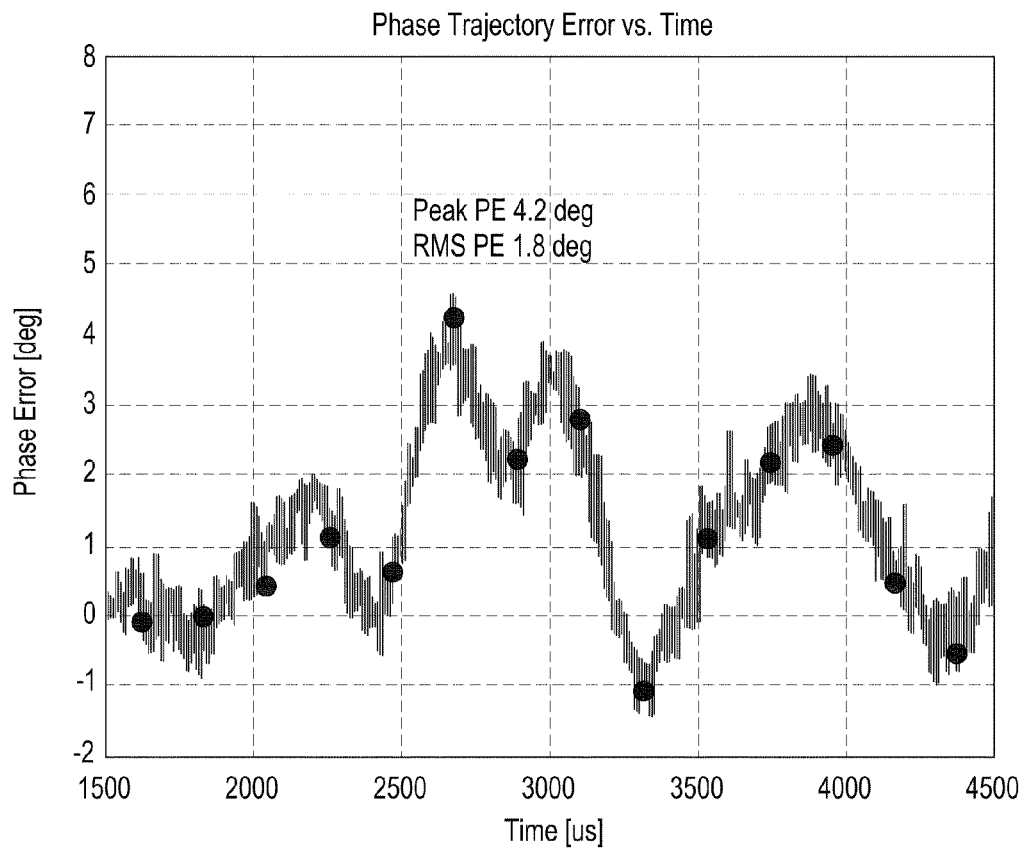
FIG. 18 is a graph showing the phase trajectory error which is the numerical difference of ideal and measured phase over the transmitted packet.
Figure 19:
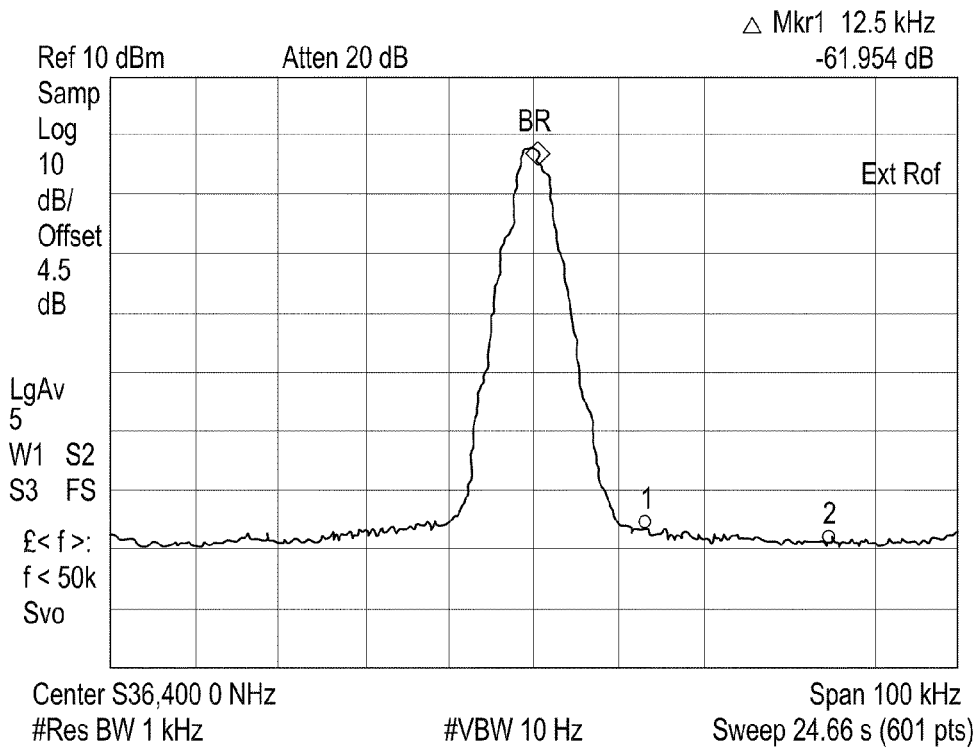
FIG. 19 represents the spectrum measured while C4FM modulation was applied to the transmitter in accordance with the present invention.

FIG. 18 shows the phase trajectory error which is the numerical difference of ideal and measured phase over the transmitted packet. The circles on the plot mark the position of the 14 symbols in the packet. The RMS phase error is calculated by taking the root-mean-square of the phase error measured at the symbols shown in the plot which is around 1.8°. Similarly, the peak phase error is the maximum phase error over the symbols, which is 4.2°. FIG. 19 represents the spectrum measured while C4FM modulation was applied to the transmitter. The spread of the carrier due to modulation is not symmetric. This is due to the fact that the data packet of 14 symbols is repeated over time and hence the data is not entirely random during the measurement. The phase noise at 12.5 kHz offset from the carrier, where the adjacent channel is located, is −62 dBc.

The testing of the DRP as the programmable RF front-end during Phase 1 will now be described in more detail. In the DRP transceiver chip, there are embedded processors that perform different configuration and control functions. For example, one task of one of the processors is to set the default values for all the registers in the chip, such as the registers that store the default values of the ADPLL loop filter parameters. It loads the modulation data control word into the RAM. After that, the data word is filtered and applied to the ADPLL to modulate the RF carrier. The best way to implement a software radio transmitter is to use the DRP chip as the programmable RF front end of the radio system. While bypassing the GSM Gaussian pulse shaping filter, the DRP chip can be programmed to handle different modulation schemes. For example, in order to generate P25 C4FM modulation data, an external device should read digitized audio data from a CODEC chip at its input interface, and then perform software root raised-cosine filtering. The filtered data is then written to the RAM and applied directly to the ADPLL (added to FCW). Similarly, on the receive side, the received signal is transferred into instantaneous in-phase (I) and quadrature (Q) samples and re-routed to the output test ports of the DRP chip. This data is tapped by an external device and post-processed to recover the transmitted data.

The Phase 1 C4FM system is tested using a TI DRP chip, a Xilinx Virtex-II Pro FPGA and a TI C54X DSP. At the transmit end, the programmable RF front-end of the DRP chip, which provides a large amount of re-configurability, is reconfigured to support C4FM. This is done by by-passing various GSM specific blocks in the transceiver and modifying the rest of the modules to support conventional digital FM. The DRP chip modulates a carrier according to the input data. The inputs to the chip are the Frequency Control Words that correspond to the frequency deviation corresponding to the input data. At the receive end, the DRP chip receives, filters and down converts the transmitted signal to output the in-phase (I) and the quadrature (Q) components of the received signal. This I and Q data needs to be demodulated and post-processed in order to recover the transmitted data. Thus, the DRP chip acts as the programmable RF front end of the P25 radio system.

The role of the DSP and the FPGA is to perform the baseband processing. At the transmit end, these devices process the input data into their corresponding symbols and perform the required RRC filtering as specified by the P25 standard document. This data is then fed as FCWs to the DRP chip. At the receive end, the DSP/FPGA pair receives the I and Q data from the DRP chip, demodulates and runs a timing estimation algorithm on the demodulated data to recover the transmitted data. Together, the three devices form the whole radio.

Figure 20:
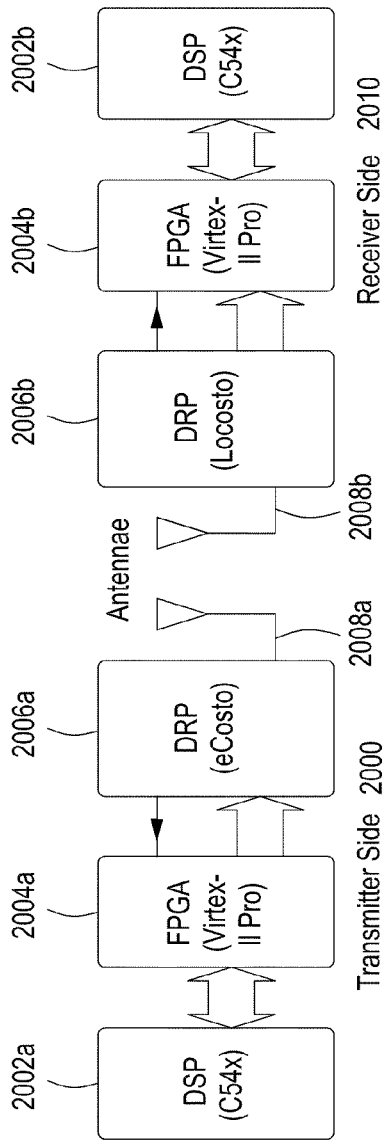
FIG. 20 is a block diagram illustrating the Phase 1 setup in accordance with one embodiment of the present invention.
Figure 21:
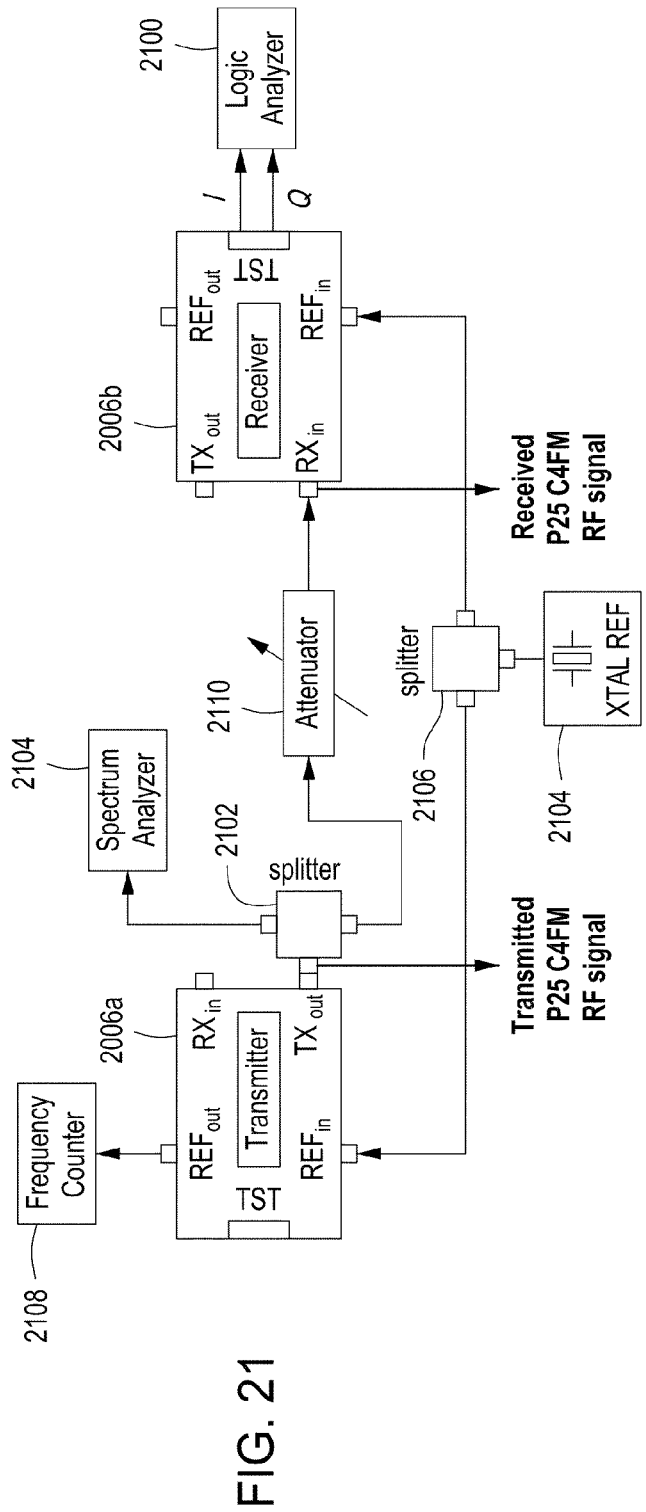
FIG. 21 is a block of the Phase 1 P25 test setup in accordance with one embodiment of the present invention.

The Phase 1 setup is shown in the FIG. 20. Individual development boards were used for each device. As will be described below, the device can be integrated onto a single PCB. The transmitter 2000 includes a DSP (C54x) 2002a, a FPGA (Virtex-II Pro) 2004a, a DRP (eCosto) 2006a and an antenna 2008a. The receiver 2010 includes an antenna 2008b, a DRP (LoCosto) 2006b, a FPGA (Virtex-II Pro) 2004b and a DSP (C54x) 2002b. Initial tests were done on the DRP chip in a memory-loop back mode. Here a fixed set of data was repeatedly transmitted. At the receiver side, the I and Q data was tapped out of the DRP chip 2006b and post-processed offline to verify the proper working of the DRP chip in P25 mode. FIG. 21 shows the test setup to verify the functionality of the DRP board in P25 mode. Two LoCosto boards were used: one to operate as a transmitter (TX) 2006a and one to operate as a receiver (RX) 2006b. The LoCosto (RX for P25 C4FM) 2006b was configured in DTST mode. The RF/analog front-end of the chip will down-convert the RF signal, filter it, and convert it into digital IQ form. Then the digital IQ data are tapped at the DTST port for further post-processing using the PC (basically using MATLAB). The output of the transmitter 2006a was split 2102 to be analyzed on a vector spectrum analyzer 2104 which can output IQ data. The output at the receiver was tapped by a logic analyzer 2100 for post-processing and verification.

The XTAL source 2104 is used to provide the reference clock signal to both chips via splitter 2106 in order to guarantee the best synchronization between the TX and RX. Otherwise the RX carrier frequency will be offset from the TX carrier frequency and huge demodulation errors may occur. The frequency counter 2108 is used to monitor the reference frequency of LoCosto TX board 2006a in order to guarantee that it is adjusted at the right value. The adjustment can be done using a specific register in LoCosto board 2006a. The attenuator 2110 guarantees that the power level at the RX input does not saturate the RF front-end. The spectrum analyzer 2104 is used to monitor the P25 C4FM modulated carrier at the TX. The TX is configured in memory loop-back mode as previously described, and the RX is adjusted in DTST mode as explained above (digital IQ data tapped at DTST port). The logic analyzer 2100 is used to monitor the digital IQ data at the DTST port of the RX LoCosto board 2006b. The data is saved for further processing in MATLAB.

Figure 22:
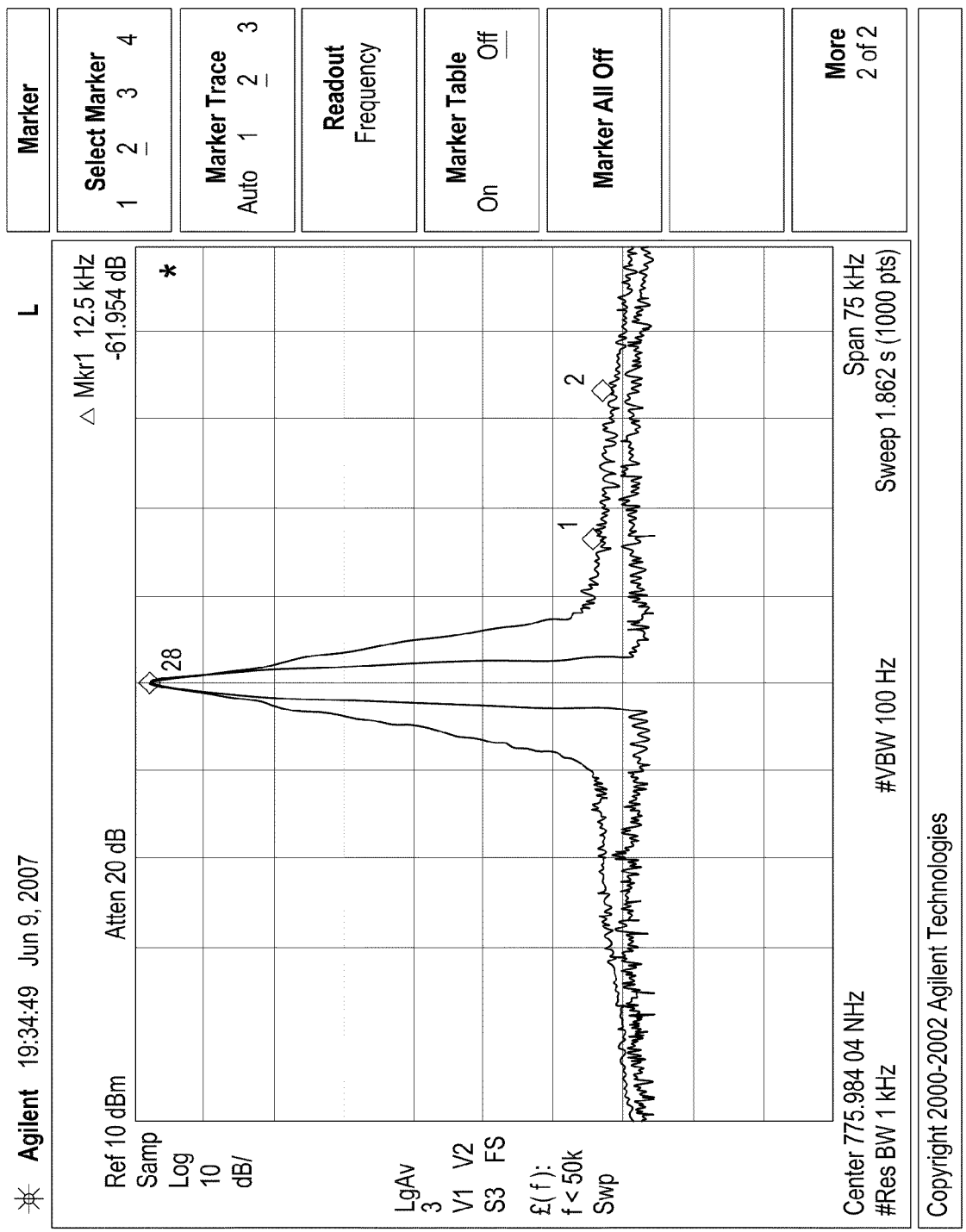
FIG. 22 is a graph showing the P25 spectrum (top) v/s an un-modulated carrier (bottom) in accordance with the present invention.
Figure 23:
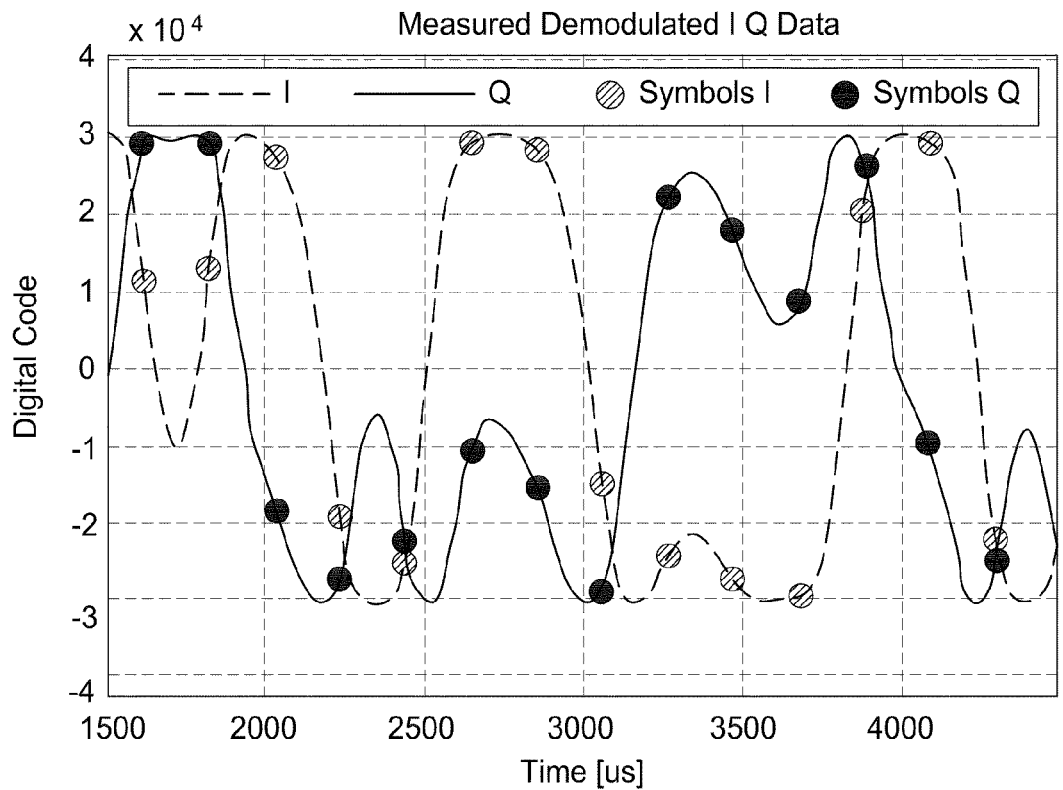
FIG. 23 is a graph showing the received I and Q data in accordance with one embodiment of the present invention.
Figure 24:
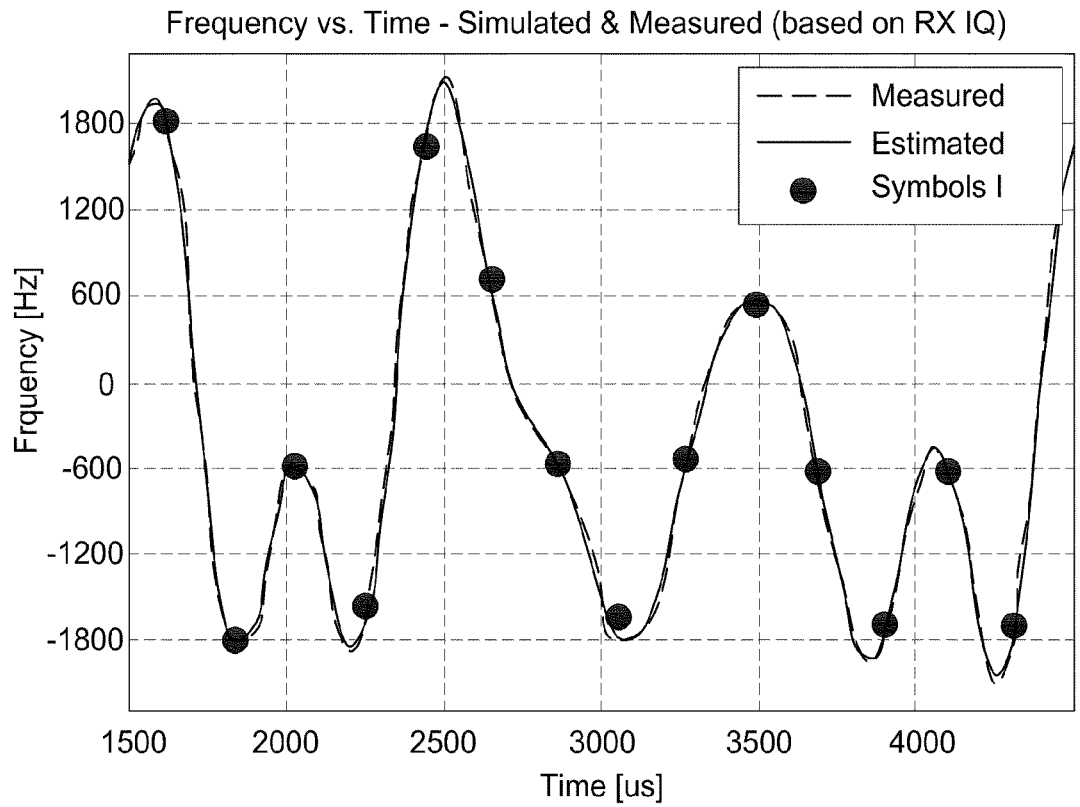
FIG. 24 is a graph showing the frequency v/s time ideal and measured in accordance with one embodiment of the present invention.
Figure 25:
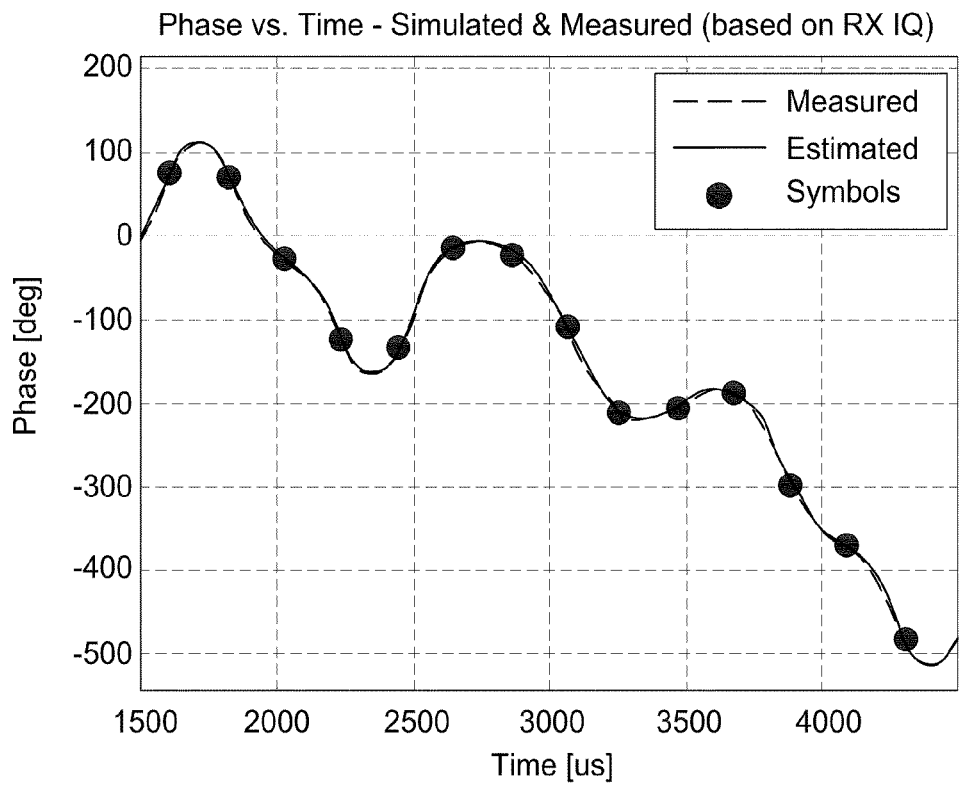
FIG. 25 shows show the phase v/s time plots of ideal and measured signals in accordance with one embodiment of the present invention.
Figure 26:
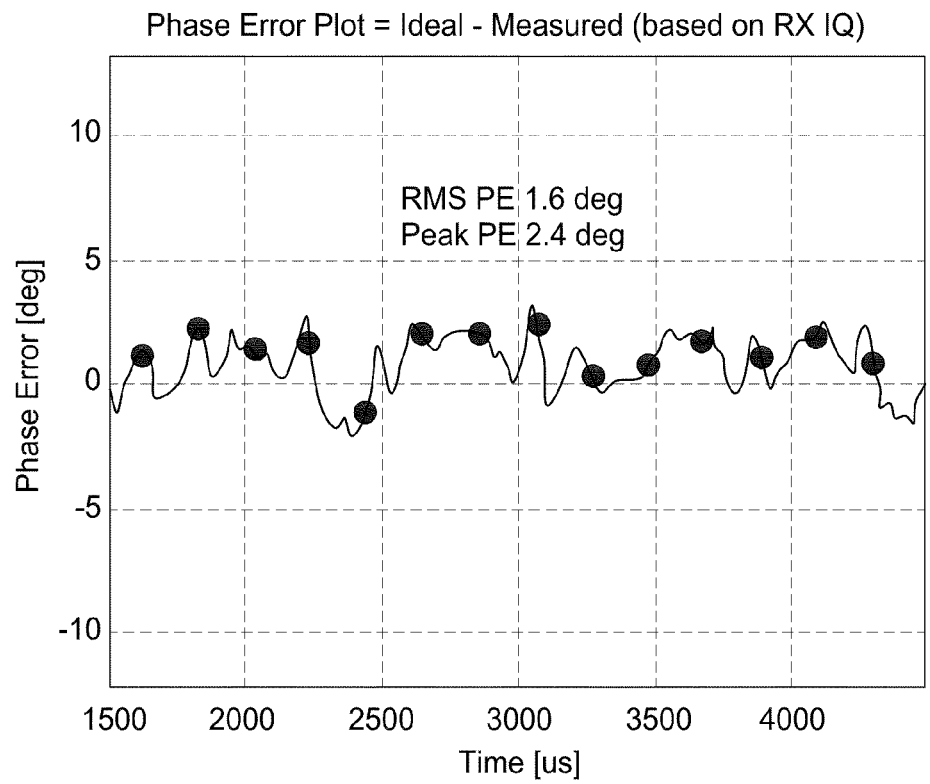
FIG. 26 shows the phase error trajectory in accordance with one embodiment of the present invention.

During early testing, errors were detected in the demodulation. The problem was a frequency drift between the reference clock frequencies of the TX 2006a and RX 2006b boards. This frequency drift appears as frequency offset between the carrier frequency of the RX 2006b and that of the TX 2006a. This means that the down-converted signal at the RX 2006b will have a sinusoidal signal whose frequency is equal to the frequency drift. As a result, the experiment was repeated after tuning the reference clock frequencies of both TX 2006a and RX 2006b boards so that the frequency drift is minimal. FIG. 22 shows the P25 spectrum (top) v/s an unmodulated carrier (bottom). FIG. 23 is a graph showing the received I data (curve starting at zero) and Q data (curve starting at three) in accordance with one embodiment of the present invention. The circles or dots represent the symbols. FIG. 24 is a graph showing the frequency v/s time ideal (solid) and measured (dotted) in accordance with one embodiment of the present invention. The circles or dots represent the symbols. Note that the lines are virtually identical. FIG. 25 shows show the phase v/s time plots of ideal and measured signals. The circles or dots represent the symbols. Note that the lines are virtually identical. FIG. 26 shows the phase error trajectory in which the maximum phase error is 2.4°, which is very close to that captured in the TX test.

Figure 27A:
FIGS. 27A and 27B are an image to be transmitted and the received image in accordance with one embodiment of the present invention.
Figure 27B:
Figure 28:
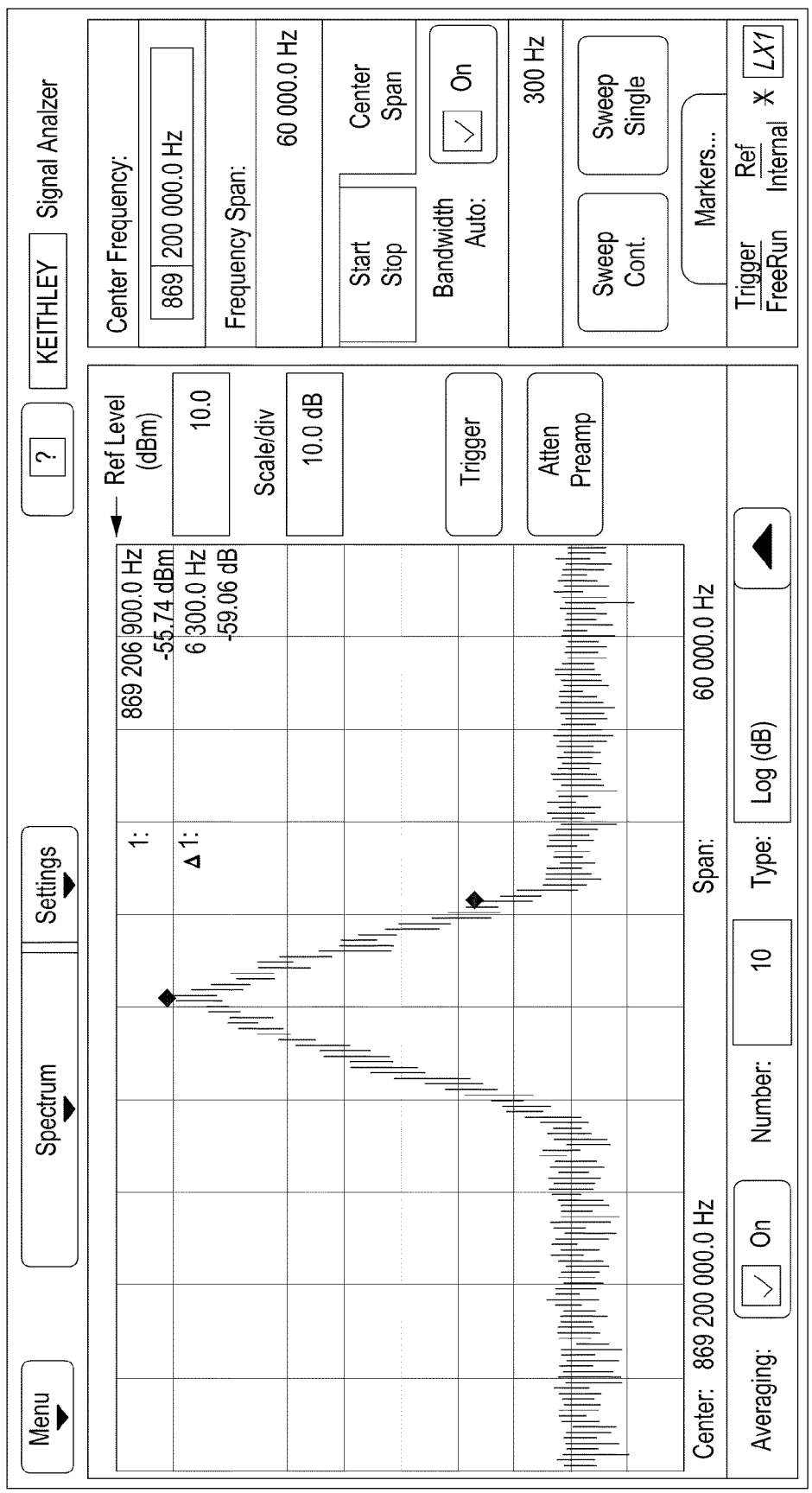
FIG. 28 shows the spectrum of signal for the image transmission in accordance with one embodiment of the present invention.

Next the DSP-FPGA-DRP setup was tested exhaustively. Currently, the DSP performs the majority of the baseband processing functions. But this can also be done using the FPGA. Several experiments were carried out to test the system, one of which was image transfer. For this experiment, a 128×128 pixel, 256-gray level image (FIG. 27A) was selected to be transmitted. At the receive end, the image data was recovered (FIG. 27B) and plotted and the bit errors were measured. As can be seen, the original image is recovered with reasonable fidelity. There are some dark lines visible in the recovered image. Those are due to the packets which were lost in transmission or the packets whose headers were detected incorrectly. On an average, the Bit Error Rate is of the order of $10^{-2}$. The image transfer experiment has also been performed for different transmitter power levels. Substantial degradation appears begin to occur in the recovered image at power levels below −55 dBm. The spectrum of signal for the image transmission is shown in FIG. 28.

Figure 29:
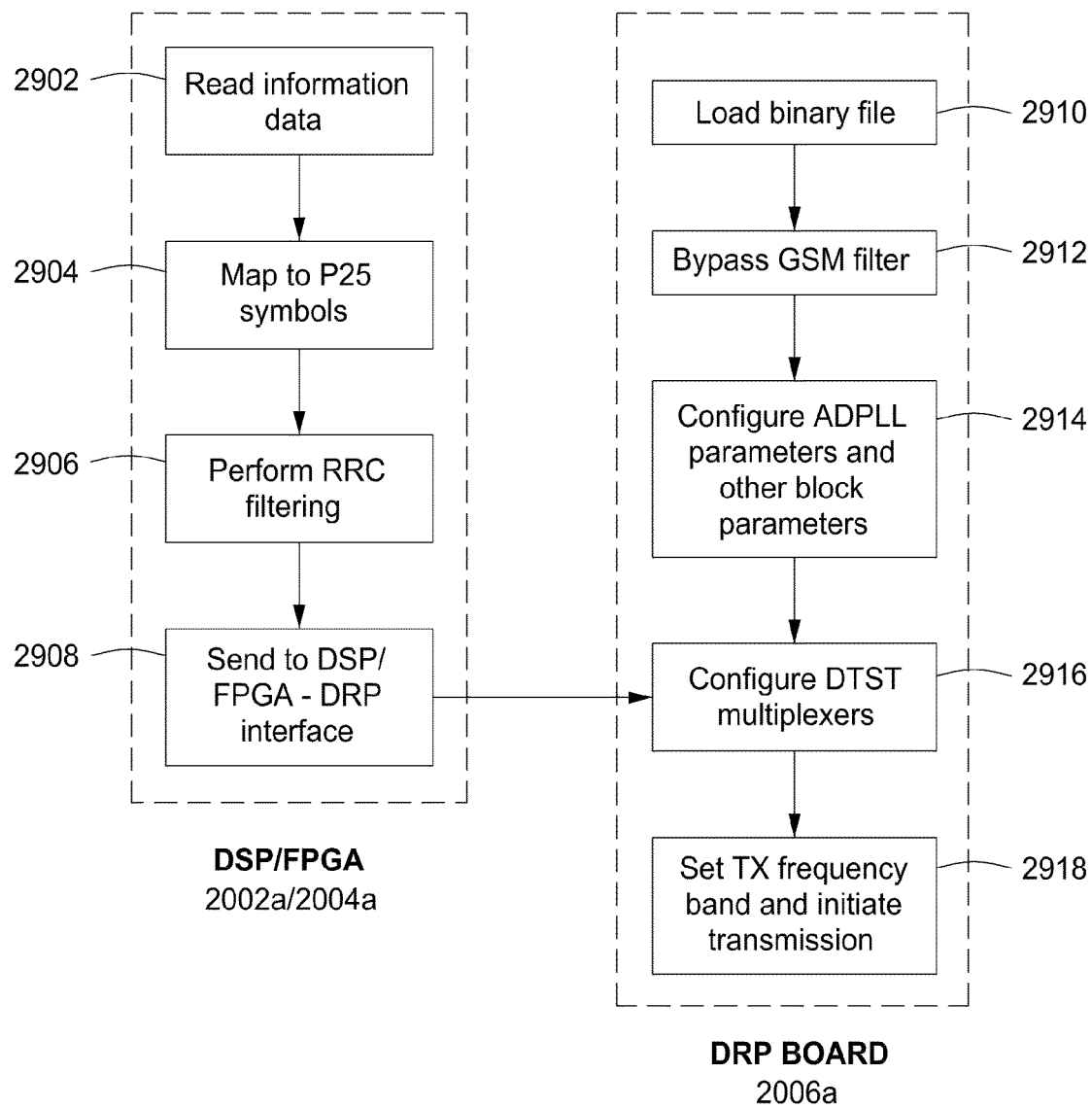
FIG. 29 is a flow chart showing the process from turning the boards ON to the start of transmission/reception of the radio in accordance with one embodiment of the present invention.

Since multiple boards are used in this embodiment of the invention, reliable data transfer from one board to another is important. Also, care needs to be taken so that the data is properly synchronized when it is being exchanged between different boards. FIG. 29 is a flow chart showing the process from turning the boards ON to the start of transmission/reception of the radio. With respect to the DSP/FPGA 2002a/2004a, information data is read in block 2902, which are mapped to P25 symbols in block 2904. RRC filtering is performed in block 2906 and data is sent to the DRP board 2006a in block 2908. With respect to the DRP board 2006, the binary file is loaded in block 2901, the GSM filter is bypassed in block 2912 and the ADPLL parameters and other block parameters are configured in block 2914. The DTST multiplexers are configured in block 2916 using the data from blocks 2908 and 2914. Thereafter, the TX frequency band is set and transmission is initiated in block 2918.

The DSP has a serial interface to communicate with external devices. Data can be input or output from the DSP using the 4-wire Serial Peripheral Interface. On the other hand, the DRP has a 32-bit parallel bus which is used to take in and give out the data. It is a synchronous parallel interface, where the data transfer into and out of the DRP board has to be synchronized with one of the many clocks that are available from the DRP board. Specifically, the DRP has two pairs of 16-bit parallel pins which in the input mode can accept Frequency and Amplitude Control Words (FCW and ACW) respectively and in the output mode can deliver in-phase (I) and quadrature-phase (Q) data.

In the normal mode of operation of the DRP chip, the transmit FCWs or the received I&Q data are generally stored on a small shared-RAM that sits between the programmable RF front-end and the base-band module in the chip. At the transmit side, the programmable RF front-end reads the FCWs written into the SRM by the baseband processing module and provides them to the ADPLL. At the receive side, the programmable RF front-end stores the received data onto the SRAM which is then read by the baseband blocks. Now, in order to use the test ports available on the DRP board to input FCWs and to tap out received data, proper registers must be configured in the DRP chip which re-route the data to the DTST ports of the DRP board. These registers control the multiplexers which handle the data routing to and from various blocks. Thus, by setting proper values in these registers, the TX/RX data is available at the DTST ports of the DRP board. Particularly, the primary registers of interest are:

DTST_MUX_SEL—Used to configure the multiplexers that handle the data flow to and from different blocks;

DTST_OEZ—Used to configure the DTST ports as input or output; and

DTST_TSTCLK—Used to set the correct synchronizing clock for the DTST input/output data.

Figure 30:
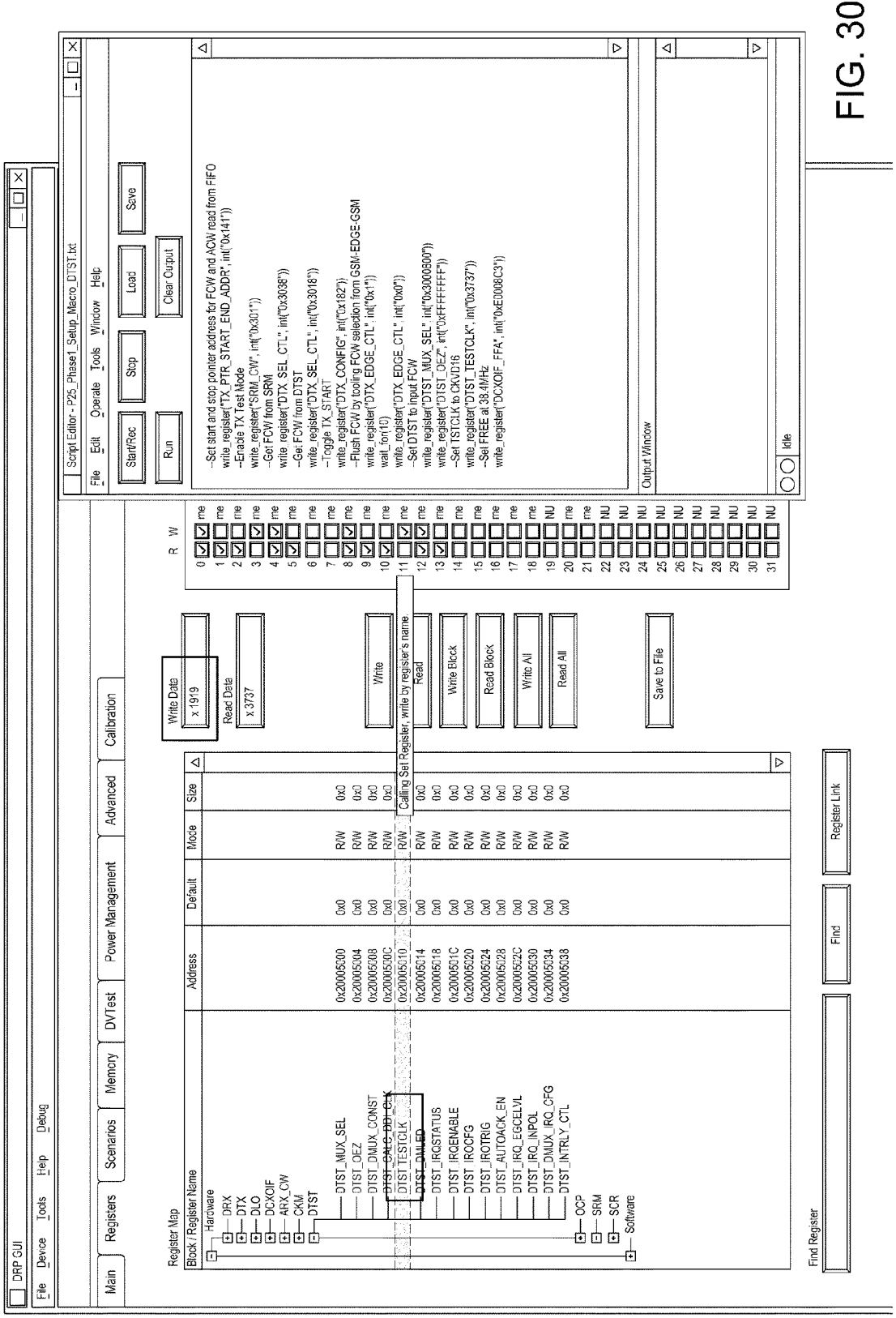
FIG. 30 shows one of the steps involved in configuring the DRP boards for P25 mode of operation in accordance with one embodiment of the present invention.

Note that these registers just configure the flow of the TX/RX data. Apart from these, there are other registers which need to be configured to bypass certain GSM specific block and to configure the ADPLL parameters so that the DRP chip can support P25 specific modulation. FIG. 30 shows one of the steps involved in configuring the DRP boards for P25 mode of operation.

The DSP (or the DSP board) can handle only one set of 16-bit parallel data interface which becomes a bottle-neck in direct DSP to DRP board communication. To solve this problem, multiple high-speed serial data ports called multi-channel buffered serial ports (McBSP) available on the DSP are used. To convert serial data to parallel and vice-versa, an FPGA is introduced in the picture. Hence, the DSP can now communicate with the DRP board through the FPGA and vice-versa using two serial connections between the DSP and FPGA and two parallel connections between the FPGA and the DRP board.

Hence, in order to faithfully communicate between DSP, FPGA and DRP; proper protocols must be implemented. One of the roles of FPGA is to act as a bridge between the DSP and the FPGA to exchange data. As mentioned before, DSP can only deal with serial input/output and the DRP uses parallel input/output. Hence, the job of the FPGA is to convert the serial data coming out of the DSP to parallel data and feed it to the DRP board on the TX side and on the receive side, the FPGA receives parallel data from the DRP board and serializes it to send it to the DSP. Thus, the FPGA effectively functions as a serializer—de-serializer.

Furthermore, the DRP reads and writes data to the FPGA at the GSM rate of 270 k samples per second. So, the serial link between the DSP and the FPGA has to work at a rate which is at least 16 times (because one FCW is 16 bits wide) higher than the GSM rate to compensate for the serial link. Also, since two ports are used on both the FPGA and DSP, both I and Q data can be communicated simultaneously.

Figure 31:
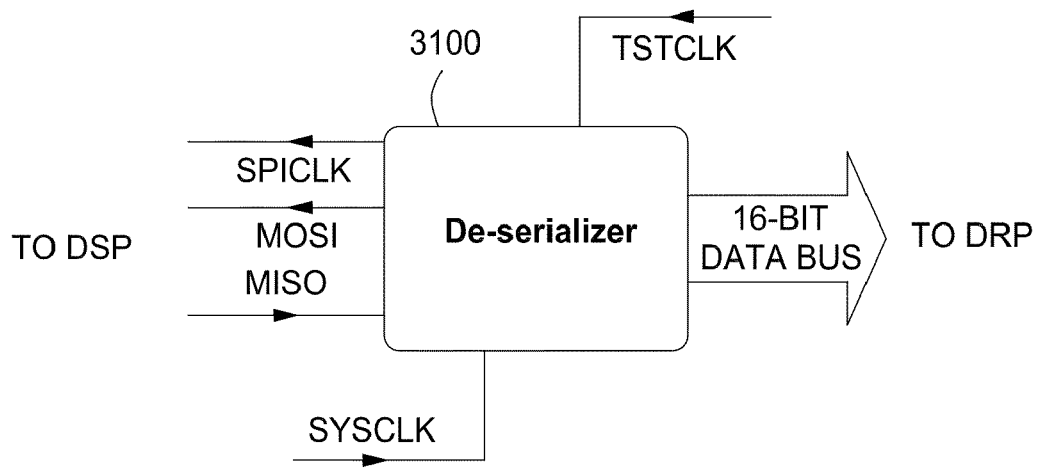
FIG. 31 shows the FPGA de-serializer module at the TX side in accordance with one embodiment of the present invention.
Figure 32:
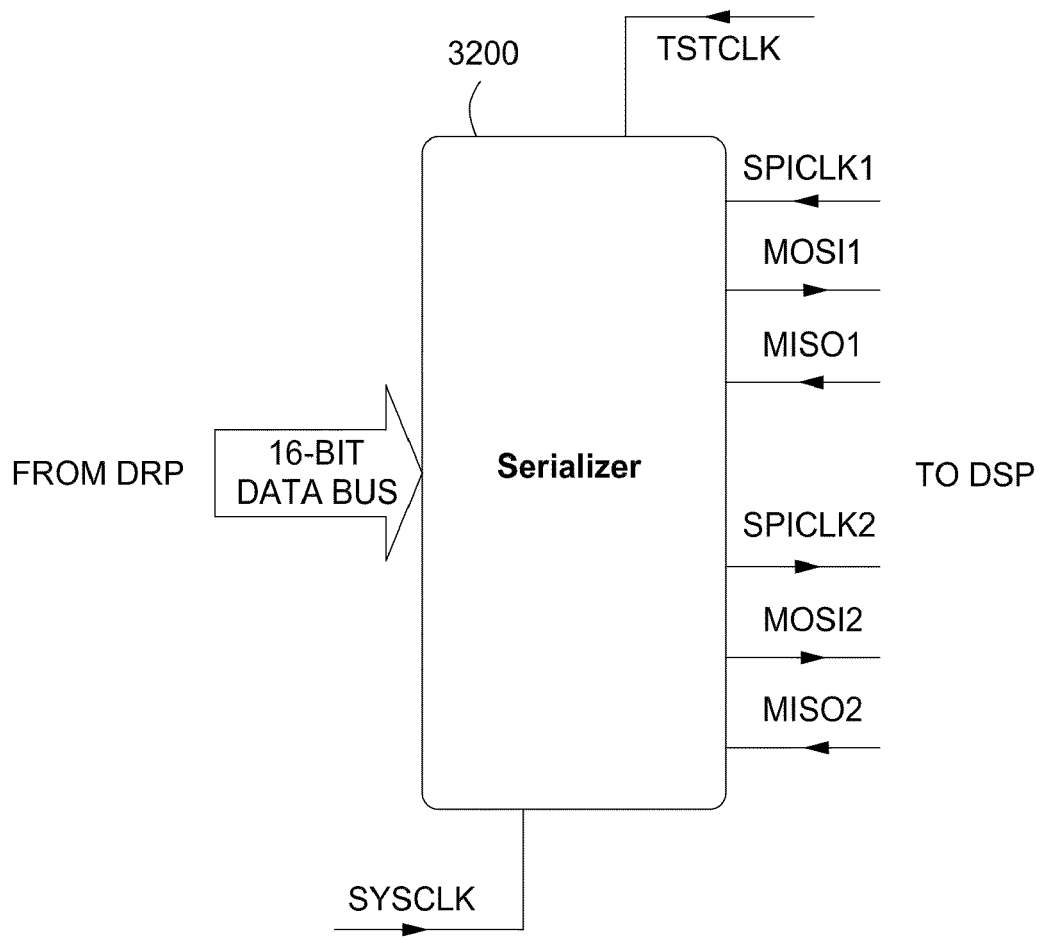
FIG. 32 shows the FPGA serializer module at the RX side in accordance with one embodiment of the present invention.
Figure 33:
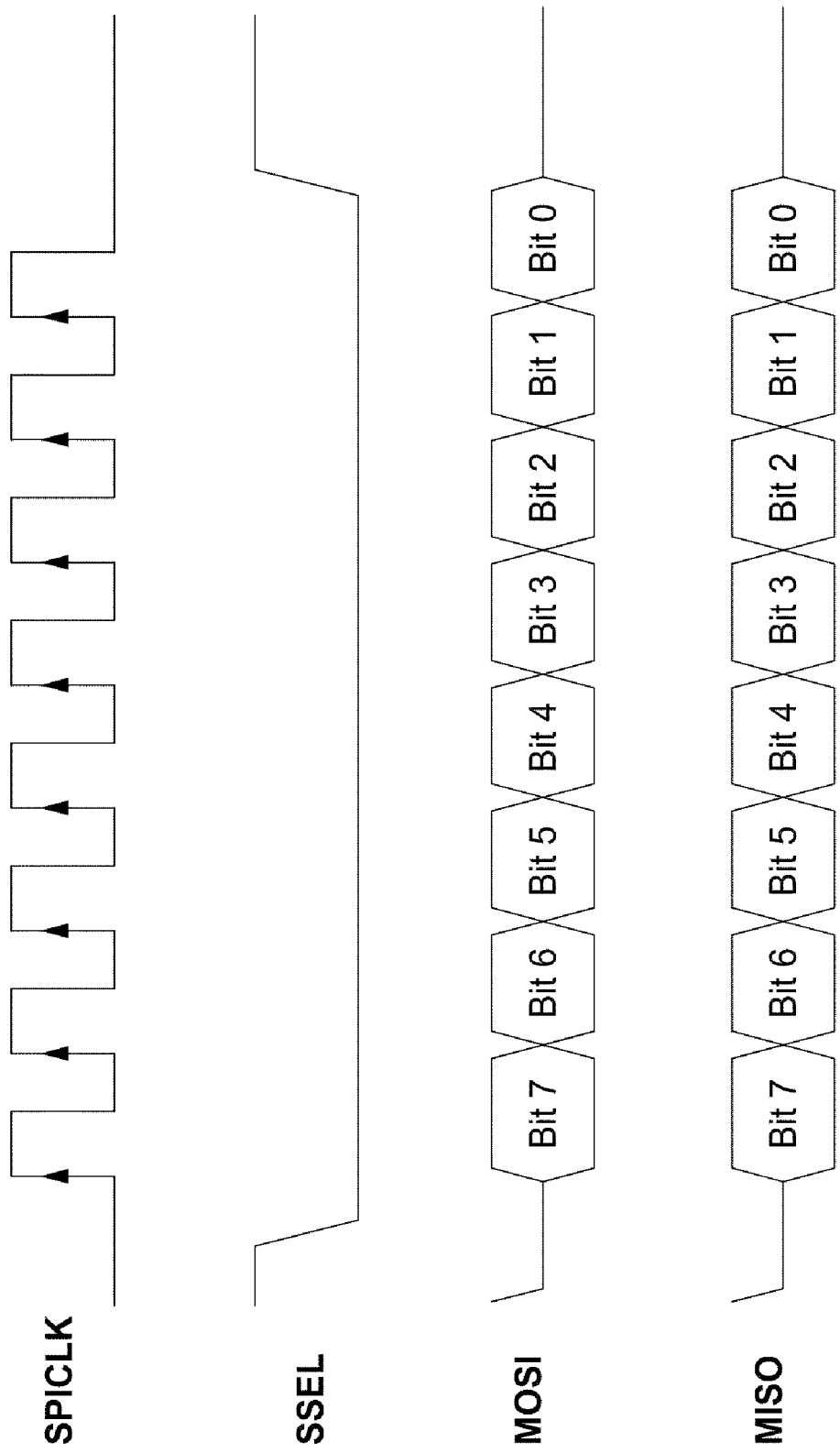
FIG. 33 shows the SPI data transfer timing diagram in accordance with one embodiment of the present invention.

FIGS. 31-33 show the block diagram of the FPGA module acting as an interface between DSP and DRP boards and the timing diagram of data transfer using SPI protocol. FIG. 31 shows the FPGA de-serializer module 3100 at the TX side. FIG. 32 shows the FPGA serializer module 3200 at the RX side. FIG. 33 shows the SPI data transfer timing diagram.

The previously described setup uses multiple boards for the various devices that are being used. This results in a very bulky and non-portable system. In order to make the system portable, these devices are being integrated onto a single Printed Circuit Board (PCB). This reduces the form factor of the radio system so that it can be hand-held and easily portable. To achieve this, the FPGA and the DSP are integrated onto one small PCB which attaches to the DRP board as a daughter-card giving us much compact setup. One embodiment of the present invention will have an approximate size of 6 in×4 in×3 in.

Figure 34:
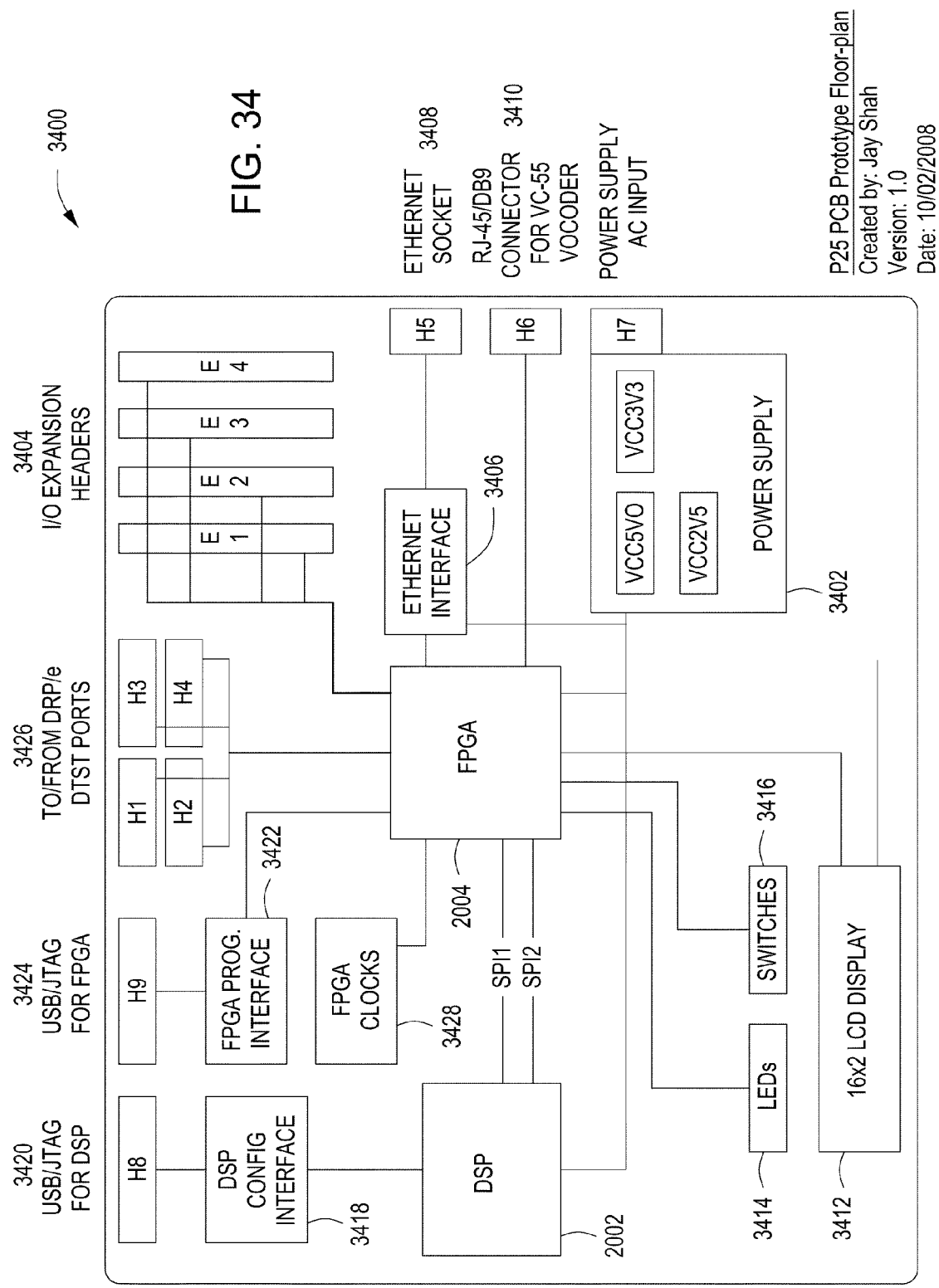
FIG. 34 is a block diagram of the DSP-FPGA daughter-card PCB in accordance with one embodiment of the present invention.

FIG. 34 is a block diagram of the DSP-FPGA daughter-card PCB 3400. In this example, the daughter-card has its own power management system 3402 which provides regulated power to the FPGA 2004, DSP 2002 and other auxiliary devices. The board will have expansion connectors 3404 that connect to the DRP chip. The DSP 2002 and FPGA 2004 will have two dedicated serial channels SPI1 and SPI2 to communicate with each other. A 10/100 Ethernet interface 3406 will also be integrated so that the FPGA 2004 can directly communicate with a PC via Ethernet socket 3408. As a result, the option of building the base-band processing blocks entirely in the DSP 2002 or on the FPGA 2004 is provided. Moreover, an RS-232 interface 3410 is included so that a P25 standard prescribed IMBE vocoder board can interfaced into the system. This is useful when the system is used to transmit voice data. A LCD display 3412, few LEDs 3414 and some switches 3416 are also included to facilitate debugging and can be used for user inputs. A DSP Configuration Interface 3418 is provided via USB/JTAG connector 3420. Similarly, a FPGA Programming Interface 3422 is provided via USB/JTAG connector 3424. Four connectors 3426 provide a connection to/from the DRP/e DTST ports and the FPGA 2004. FPGA Clocks 3428 are also connected to FPGA 2004.

Phase 2 (CQPSK modulation) will now be described. In Phase 2, digital information is transmitted over a 6.25 KHz channel using the CQPSK modulation format. CQPSK modulates the phase and simultaneously modulates the carrier amplitude to minimize the width of the emitted spectrum which generates an amplitude modulated waveform. The modulation sends 4800 symbols/sec with each symbol conveying 2 bits of information. The mapping between symbols and bits is shown in the following table:

| Information Bits | Corresponding Symbol | CQPSK phase change (degrees) |
| --- | --- | --- |
| 00 | +3 | +135 |
| 01 | +1 | +45 |
| 10 | −1 | −45 |
| 11 | −3 | −135 |

Figure 35:
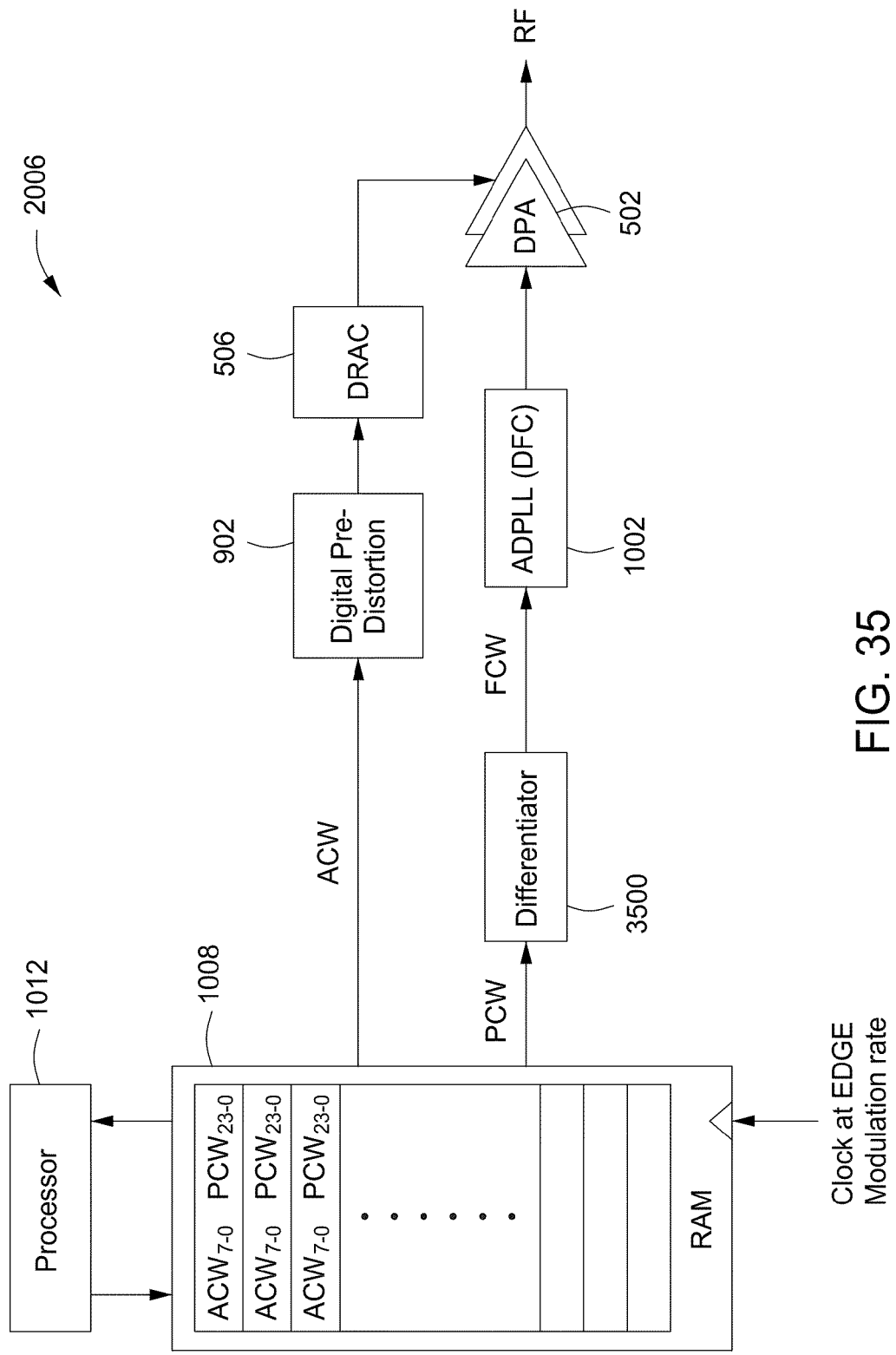
FIG. 35 shows a simplified block diagram illustrating use of DRP chip for CQPSK data transmission in accordance with one embodiment of the present invention.

The technique for P25 Phase 2 (CQPSK transmission) is similar to the technique used in P25 Phase 1 (C4FM transmission). The modulation data is programmed in the Shared RAM Module (SRM) 1008 and then fed to the DCO (more precisely, the ADPLL 1002) and the DPA 502 directly. Each memory word in the SRM 1008 is composed of 4 8-bit sub-words. The first 8-bit sub-word is used to store Amplitude Control Word (ACW), and the 24 remaining bits are used to store the Frequency Control Word (FCW). Since Phase 2 involves phase modulation rather than frequency modulation (which was used in C4FM), a phase control word (PCW) is used instead of an FCW. This is not a problem. Since frequency is a differential of phase, the PCW can be differentiated with differentiator 3500 to get the corresponding FCW. FIG. 35 shows a simplified block diagram illustrating use of DRP chip 2006 for CQPSK data transmission.

There are two main issues in using DRP TX for P25 Phase-2 CQPSK data transmission. First, the synchronization of the phase and amplitude signals at the DPA input. In the DRP chip, there are many synchronization blocks used for this purpose. Unfortunately they are designed to operate at the GSM/EDGE rates which are different from the 4.8 kHz CQPSK rate. Second, the DRAC resolution needs to be sufficient for CQPSK. The resolution of the DRAC in terms of the used number of bits and the ΔΣ-modulator was designed for EDGE standard.

As demonstrated above and shown in FIG. 36, the present invention provides a system 3600 that includes a cellular communications network 3602 supporting a cellular communication standard (e.g., CDMA, WCDMA, EDGE, GPRS, GSM, LTE, TDMA, OFDM, etc.), a non-cellular communications network 3604 supporting a non-cellular communication standard (e.g., Bluetooth, IEEE 802.11, P25, UMTS, non-P25 emergency standard, etc.), and two or more mobile stations 3606 (a and b) that can communicate with both the cellular communications network 3602 and the non-cellular communications network 3604. As shown in FIG. 37, each mobile station includes an antenna 3702, a programmable cellular radio front end 3704 connected to the antenna 3702 that includes a digital radio frequency processor configured to support the cellular communication standard, and a programmable baseband processor 3706 connected to the digital radio frequency processor 3704 and a user interface 3708. The mobile station 3606 may include other features, functions, modules and components, such as an IMBE vocoder connected to the programmable baseband processor 3706. In addition, the mobile station 3606 can be configured, adapted or integrated into any portable device, such as a mobile phone, a handheld computer, a laptop, a personal data assistant, or a vehicle. More simply, the present invention provides a software defined radio transceiver that includes a programmable cellular radio front end 3704 and a programmable baseband processor 3706.

As shown in FIG. 38, the programmable baseband processor 3706 (a) selectively reconfigures the cellular configured digital radio frequency processor to communicate with the non-cellular communications network by bypassing one or more cellular communication standard specific function, and modifying one or more operating parameters to conform to the non-cellular communication standard in block 3802, (b) processes input data in accordance with the non-cellular communication standard and provides the processed input data to the digital radio frequency processor for transmission in block 3804, and (c) receives output data from the digital radio frequency processor and processes the received output data to obtain transmitted data in block 3806. For, example, when the communication standards are GSM and P25, the digital radio frequency processor 3704 is a GSM digital radio frequency processor, and the programmable baseband processor 3706 configures the GSM digital radio frequency processor 3704 to support the P25 communication standard by loading a binary file, bypassing a GSM filter, configuring ADPLL parameters to set a transmit frequency modulated signal, configuring other block parameters, and configuring DTST multiplexers.

The programmable baseband processor 3706 can processes the input data by mapping the input data to symbols and filtering the symbols all in accordance with the non-cellular communication standard. Moreover, the programmable baseband processor 3706 processes the received output data by demodulating the received output data and runs a timing estimation algorithm on the demodulated output data. The programmable baseband processor 3706 may also provide serial-to-parallel data conversion, parallel-to-serial data conversion and compensate for different sampling rates.

The programmable baseband processor 3706 may include a digital signal processor, a field-programmable gate array, or a digital signal processor and a field-programmable gate array connected to the digital radio frequency processor and the digital signal processor. Moreover, the digital radio frequency processor 3704 and the programmable baseband processor 3706 can be integrated into a single semiconductor device.

Figure 39:
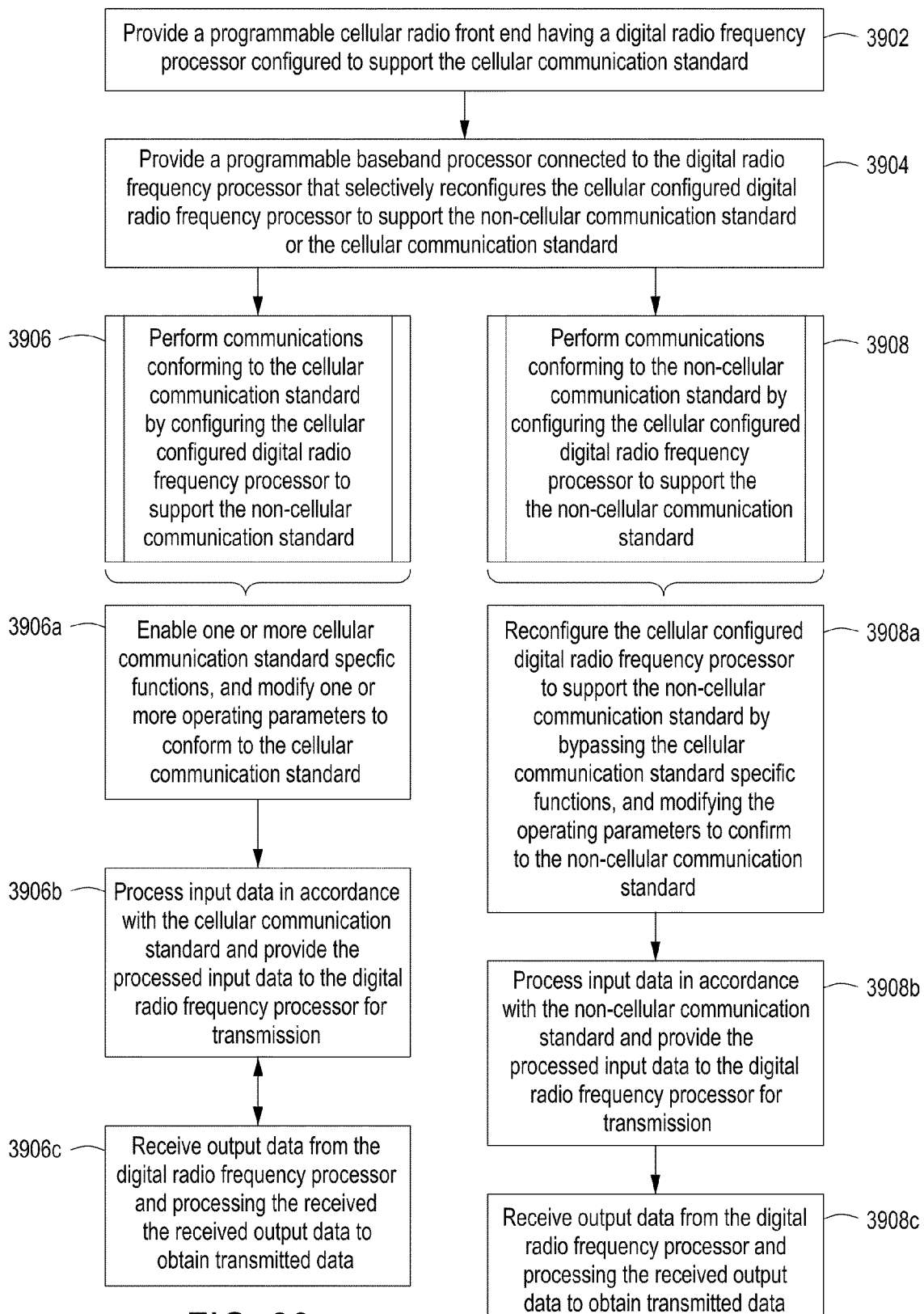
FIG. 39 is a block diagram depicting a method for providing communications that conform to a cellular communication standard and a non-cellular communication standard.

FIG. 39 depicts a method for providing communications that conform to a cellular communication standard and a non-cellular communication standard. A programmable cellular radio front end 3704 having a digital radio frequency processor configured to support the cellular communication standard is provided in block 3902. A programmable baseband processor 3706 connected to the digital radio frequency processor 3704 that selectively reconfigures the cellular configured digital radio frequency processor 3704 to support the non-cellular communication standard or the cellular communication standard is provided in block 3904. Communications conforming to the cellular communication standard are performed by configuring the cellular configured digital radio frequency processor 3704 to support the non-cellular communication standard in block 3906. More specifically, one or more cellular communication standard specific functions are enabled, and one or more operating parameters are modified to conform to the cellular communication standard in block 3906a. Input data is processed in accordance with the cellular communication standard and the processed input data is provided to the digital radio frequency processor 3704 for transmission in block 3906b. Output data is received from the digital radio frequency processor 3704 and the received output data is processed to obtain transmitted data in block 390c. Communications conforming to the non-cellular communication standard are performed by configuring the cellular configured digital radio frequency processor 3704 to support the non-cellular communication standard in block 3908. The cellular configured digital radio frequency processor 3704 is reconfigured to support the non-cellular communication standard by bypassing the cellular communication standard specific functions, and modifying the operating parameters to conform to the non-cellular communication standard in block 3908a. Input data is processed in accordance with the non-cellular communication standard and the processed input data is provided to the digital radio frequency processor 3704 for transmission in block 3908b. Output data is received from the digital radio frequency processor 3704 and the received output data is processed to obtain transmitted data transceiver in block 3908c.

The programmable baseband processor 3706 may processes the input data by mapping the input data to symbols and filtering the symbols all in accordance with the non-cellular communication standard, and processes the received output data by demodulating the received output data and runs a timing estimation algorithm on the demodulated output data.

REFERENCES

[1] R. Bagheri, A. Mirzaei, S. Chehrazi, et al., "An 800 MHz to 5 GHz software-defined radio receiver in 90 nm CMOS," in Proc. of IEEE Solid-State Circuits Conf., 2006, pp. 480-481.
[2] F. Jondral, "Software-Defined Radio—Basics and Evolution to Cognitive Radio," EURASIP Journal on Wireless Communications and Networking, no. 3, pp. 275-283, 2005.
[3] R. B. Staszewski et al., "All-Digital PLL and Transmitter for Mobile Phones," IEEE Journal of Solid State Circuits, vol. 40, no. 12, pp. 2469-2482, December 2005.
[4] K. Muhammad et al., "The First Fully Integrated Quad-Band GSM/GPRS Receiver in a 90-nm Digital CMOS Process," IEEE Journal of Solid State Circuits, vol. 41, no. 8, pp. 1772-1783, August 2006.
[5] Daniels Electronics LTD. (2004) P25 training guide. [Online]. Available: http://www.p25.com/resources/P25TrainingGuide.pdf
[6] R. B. Staszewski and R. Staszewski, "Interpolative Pulse-Shape Filtering for a GSM/Bluetooth Transmitter," in IEEE Dallas Circuits and Systems Workshop (DCAS), 2005, pp. 191-194.
[7] R. Staszewski et al., "Software Assisted Digital RF Processor for Single-Chip GSM Radio in 90 nm CMOS," in IEEE Custom Intergrated Circuits Conference (CICC), 2006, pp. 611-614.

[5] P. Cruise et. al., "A digital-to-RF-amplitude converter for GSM/GPRS/EDGE in 90-nm digital CMOS," IEEE Radio Frequency Integrated Circuits (RFIC) Symposium, pp. 21-24, 2005.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A radio transceiver comprising:
    a programmable cellular radio front end comprising a digital radio frequency processor configured to support a cellular communication standard;
    a programmable baseband processor connected to the digital radio frequency processor, programmed with instructions stored in a memory, that when executed by the programmable baseband processor perform the steps of:
    (a) selectively bypassing a set of cellular communication standard specific functions in the digital radio frequency processor;
    (b) selectively modifying a set of operating parameters to conform the radio transceiver to the non-cellular communication standard;
    (c) processing a set of input data in accordance with the non-cellular communication standard including mapping the set of input data to a set of symbols and selectively filtering the set of symbols in accordance with the non-cellular communication standard;
    (d) providing the processed set of input data to the digital radio frequency processor for transmission;
    (e) receiving a set of output data from the digital radio frequency processor;
    (f) demodulating the received set of output data to obtain a set of demodulated data; and,
    (g) running a timing estimation algorithm on the set of demodulated data.

2. The radio transceiver recited in claim 1, wherein the programmable baseband processor comprises a digital signal processor.

3. The radio transceiver recited in claim 1, wherein the digital radio frequency processor and the programmable baseband processor are integrated into a single semiconductor device.

4. The radio transceiver recited in claim 1, wherein the non-cellular communication standard is P25 where P25 is the Project 25 suite of standards and further comprising an Improved Multi-Band Excitation (IMBE) vocoder connected to the programmable baseband processor.

5. The radio transceiver recited in claim 1, wherein:
    the cellular communication standard comprises GSM and the non-cellular communication standard comprises P25; and,
    the digital radio frequency processor comprises a GSM digital radio frequency processor
    where GSM is the Global System for Mobile Communications standard from the European Telecommunications Standards Institute and P25 is the Project 25 suite of standards.

6. The radio transceiver recited in claim 1, wherein the radio transceiver is integrated into a hand held device.

7. The radio transceiver recited in claim 1, wherein:
    the cellular communication standard is selected from the group consisting of CDMA, WCDMA, EDGE, GPRS, GSM, LTE, TDMA, and OFDM; and
    the non-cellular communication standard is selected from the group consisting of Bluetooth, IEEE 802.11, P25, UMTS, and a non-P25 emergency standard
    where GSM is the Global System for Mobile Communications standard from the European Telecommunications Standards Institute and P25 is the Project 25 suite of standards.

8. The radio transceiver recited in claim 1, wherein the programmable baseband processor is further programmed with instructions stored in the memory, that when executed perform the steps of:
    (a) performing serial-to-parallel data conversion;
    (b) performing parallel-to-serial data conversion; and,
    (c) compensating for a plurality of sampling rates.

9. The radio transceiver recited in claim 1, wherein the programmable baseband processor comprises a field-programmable gate array.

10. The radio transceiver recited in claim 2, wherein the programmable baseband processor comprises a field-programmable gate array connected to the digital radio frequency processor and the digital signal processor.

11. The radio transceiver of claim 5 wherein the GSM digital radio frequency processor is programmed with a set of instructions stored in a processor memory, that when executed by the GSM digital radio frequency processor, supports P25 by performing the steps of:
    (a) loading a binary file;
    (b) bypassing a GSM filter;
    (c) configuring a set of parameters for an all digital phase-locked loop to set a transmit frequency modulated signal;
    (d) configuring a set of block parameters for a set of functional blocks of the GSM digital radio frequency processor; and,
    (e) configuring a set of multiplexers to route data between the set of functional blocks.

12. A method for providing communications that conform to a cellular communication standard and a non-cellular communication standard comprising the steps of:
    providing a radio transceiver having a programmable cellular radio front end having a digital radio frequency processor;

configuring the digital radio frequency processor to support the cellular communication standard;
providing a programmable baseband processor connected to the digital radio frequency processor;
selectively reconfiguring the cellular configured digital radio frequency processor to support a communication standard chosen from the group of the non-cellular communication standard and the cellular communication standard;
performing communications conforming to the cellular communication standard by
  (a) enabling a set of cellular communication standard specific functions, and modifying a set of operating parameters to conform to the cellular communication standard,
  (b) processing a first set of input data in accordance with the cellular communication standard and providing the processed first set of input data to the digital radio frequency processor for transmission, and
  (c) receiving a first set of output data from the digital radio frequency processor and processing the received first set of output data to obtain a first set of transmitted data; and,
performing communications conforming to the non-cellular communication standard by
  (a) reconfiguring the cellular configured digital radio frequency processor to support the non-cellular communication standard by bypassing the set of cellular communication standard specific functions, and modifying the set of operating parameters to conform to the non-cellular communication standard,
  (b) processing a second set of input data in accordance with the non-cellular communication standard by mapping the second set of input data to a set of symbols and filtering the set of symbols in accordance with the non-cellular communication standard, and providing the processed second set of input data to the digital radio frequency processor for transmission, and
  (c) receiving a second set of output data from the digital radio frequency processor and processing the received second set of output data by demodulating the received second set of output data to obtain a set of demodulated data
  running a timing estimation algorithm on the demodulated data.

13. The method recited in claim 12, including the step of providing a digital signal processor for the programmable baseband processor.

14. The method recited in claim 12, including the step of integrating the digital radio frequency processor and the programmable baseband processor into a single semiconductor device.

15. The method recited in claim 12, including the steps:
selecting P25 as the non-cellular communication standard where P25 is the Project 25 suite of standards; and,
providing an Improved Multi-Band Excitation (IMBE) vocoder for the programmable baseband processor.

16. The method recited in claim 12, including the steps:
selecting P25 as the non-cellular communication standard where P25 is the Project 25 suite of standards;
selecting GSM as the cellular communication standard where GSM is the Global System for Mobile Communications standard from the European Telecommunications Standards Institute;
configuring the digital radio frequency processor as a GSM digital radio frequency processor; and configuring the GSM digital radio frequency processor to support the P25 communication standard by:
  loading a binary file,
  bypassing a GSM filter,
  configuring a set of parameters for an all digital phase-locked loop to set a transmit frequency modulated signal,
  configuring a set of block parameters for a set of functional blocks of the GSM digital radio frequency processor, and,
  configuring a set of multiplexers to route data between the set of functional blocks.

17. The method recited in claim 12, including the step of integrating the radio transceiver into a hand held device.

18. The method recited in claim 12, including the steps:
selecting the cellular communication standard from the group consisting of CDMA, WCDMA, EDGE, GPRS, GSM, LTE, TDMA, and OFDM; and
selecting the non-cellular communication standard from the group consisting of Bluetooth, IEEE 802.11, P25, UMTS, and a non-P25 emergency standard
where GSM is the Global System for Mobile Communications standard from the European Telecommunications Standards Institute and P25 is the Project 25 suite of standards.

19. The method recited in claim 12, including the steps:
performing serial-to-parallel data conversion and parallel-to-serial data conversion in the programmable baseband processor; and,
compensating for a plurality of sampling rates.

20. The method recited in claim 12, including the step of providing a field-programmable gate array for the programmable baseband processor.

21. The method recited in claim 13, including the step of providing a field-programmable gate array connected to the digital radio frequency processor and the digital signal processor.

22. A communications system utilizing a cellular communications network supporting a cellular communication standard and a non-cellular communications network supporting a non-cellular communication standard, comprising:
a set of mobile stations configured to communicate with both the cellular communications network and the non-cellular communications network; and
wherein each mobile station in the set of mobile stations comprises an antenna, a programmable cellular radio front end comprising a digital radio frequency processor configured to support the cellular communication standard, and a programmable baseband processor connected to the digital radio frequency processor, programmed with instructions stored in a memory, that when executed by the programmable baseband processor carry out the steps of:
(a) selectively communicating with the non-cellular communications network by:
  i. bypassing a set of cellular communication standard specific functions, and,
  ii. modifying a set of operating parameters to conform to the non-cellular communication standard;
(b) processing a set of input data in accordance with the non-cellular communication standard by mapping the set of input data to a set of symbols and filtering the set of symbols in accordance with the non-cellular communication standard;
(c) providing the processed a set of input data to the digital radio frequency processor for transmission; and, (d) receiving a set of output data from the digital radio frequency processor and demodulating the received set of output data to obtain a set of demodulated data.

23. A communication system utilizing a first digital RF processor (DRP) and a second DRP, the first DRP having a first programmable RF processor and a first programmable baseband processor, a second DRP having a second programmable RF processor and a second programmable baseband processor, both the first DRP and the second DRP configurable for cellular communications according to a cellular communications standard, comprising:

a radio transmitter further comprising a first memory, a first digital signal processor (DSP), a first field programmable gate array (FPGA) connected to the first DSP, the first DRP connected to the first FPGA, a first DRP memory in the first DRP and a first antenna connected to the first DRP wherein the first FPGA is configured to translate a first set of communication signals between the first DSP and the first DRP;

a radio receiver further comprising a second memory, the second DRP, a second FPGA connected to the second DRP, a second DSP connected to the second FPGA, a second DRP memory in the second DRP and a second antenna connected to the second DRP, wherein the second FPGA is configured to translate a second set of communication signals between the second DSP and the second DRP;

wherein the first memory includes a first set of instructions, that when executed by the first DSP performs the steps:

(a) receiving a set of input data into the first memory;

(b) mapping the set of input data into a set of input symbols according to a non-cellular communications standard;

(c) filtering the set of input symbols according to a filter function prescribed by the non-cellular communications standard to create a set of modulation word data; and, (d) transmitting the set of modulation word data to the first DRP using the first FPGA;

wherein the first memory includes a second set of instructions, that when executed by the first DRP performs the steps:

(e) loading the set of modulation word data into the first DRP memory;

(f) configuring a set of PLL parameters for a first digital phase locked loop included in the first DRP;

(g) transmitting the set of modulation word data from the first DRP memory to the first digital phase locked loop;

(h) modulating a carrier signal according to the set of modulation control words to form a modulated signal; and, (i) transmitting the modulated signal from the first DRP to the second DRP using the first antenna;

wherein the second DRP memory includes a third set of instructions, that when executed by the second DRP performs the steps:

(j) receiving the modulated signal from the first DSP using the second antenna;

(k) downconverting, filtering and converting the received modulated signal into a set of digital IQ data; and, (l) transmitting the set of digital IQ data to the second DSP using the second FPGA;

wherein the second memory includes a fourth set of instructions, that when executed by the second DSP performs the steps:

(m) demodulating the set of digital IQ data to recover the set of input data; and, (n) storing the recovered set of input data in the second memory.

24. The communication system of claim 23 wherein the non-cellular communication standard uses P25 compliant continuous four level FM modulation, where P25 is the Project 25 suite of standards.

25. The communication system of claim 23 wherein the set of modulation data includes a set of amplitude control words and a set of frequency control words.

26. The communication system of claim 23 wherein the non-cellular communication standard is uses P25 compliant compatible quadrature phase shift keying (CQPSK) and where P25 is the Project 25 suite of standards.

27. The communication system of claim 26 wherein the set of modulation data includes a set of amplitude control words and a set of phase control words.

28. The communication system of claim 27 wherein the first DRP includes a differentiator and wherein the step (g) includes transmitting the set of modulation word data from the first DRP memory to the differentiator, differentiating the set of modulation word data and sending the differentiated set of modulation word data to the first digital phase locked loop.

* * * * *